(12) United States Patent
Snyder (10) Patent No.: US 10,137,392 B2
(45) Date of Patent: Nov. 27, 2018

(54) FIBER WEBS COATED WITH FIBER-CONTAINING RESINS

(71) Applicant: Hollingsworth & Vose Company, East Walpole, MA (US)

(72) Inventor: Mark Snyder, Nashua, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 476 days.

(21) Appl. No.: 13/715,357

(22) Filed: Dec. 14, 2012

(65) Prior Publication Data

US 2014/0166572 A1    Jun. 19, 2014

(51) Int. Cl.
   *B01D 39/18* (2006.01)
   *B01D 39/16* (2006.01)

(52) U.S. Cl.
   CPC ......... *B01D 39/18* (2013.01); *B01D 39/1623* (2013.01); *B01D 2239/025* (2013.01); *B01D 2239/0492* (2013.01); *Y10T 442/20* (2015.04); *Y10T 442/277* (2015.04); *Y10T 442/2861* (2015.04); *Y10T 442/2992* (2015.04)

(58) Field of Classification Search
   CPC ......... Y10T 442/2869; Y10T 442/2861; Y10T 442/60; Y10T 442/602; Y10T 442/684; Y10T 442/686; Y10T 442/695; Y10T 442/693; Y10T 442/277
   USPC .... 210/507, 508; 442/59, 76, 118, 121, 126, 442/152, 164, 165
   See application file for complete search history.

(56) References Cited

U.S. PATENT DOCUMENTS

| | | |
|---|---|---|
| 3,083,118 A | 3/1963 | Bridgeford |
| 3,290,207 A | 12/1966 | Magat et al. |
| 3,441,515 A | 4/1969 | Oshida et al. |
| 3,865,732 A | 2/1975 | Terhune et al. |
| 4,639,513 A | 1/1987 | Hou et al. |
| 5,196,470 A | 3/1993 | Anderson et al. |
| 5,366,832 A | 11/1994 | Hayashi et al. |
| 5,580,459 A | 12/1996 | Powers et al. |
| 5,597,645 A | 1/1997 | Pike et al. |

(Continued)

FOREIGN PATENT DOCUMENTS

| | | |
|---|---|---|
| CN | 101081309 A | 12/2007 |
| CN | 101380535 A | 3/2009 |

(Continued)

OTHER PUBLICATIONS

Tensile Testing Basics, Tips and Trends, 2005, Quality Test & Inspection.*

(Continued)

*Primary Examiner* — Allison G Fitzsimmons
(74) *Attorney, Agent, or Firm* — Wolf, Greenfield & Sacks, P.C.

(57) ABSTRACT

Fiber webs that may be coated and used in filter media are provided. In some embodiments, the fiber web is a nonwoven web that is coated with a resin comprising fibers. For example, the resin may include fibers that have sizes (e.g., diameters) in the nano or micron range. In some cases, the fibers distributed within the resin are fibrillated fibers. The respective characteristics and amounts of the fibers in the resin may be selected to impart desirable properties including enhanced mechanical properties and filtration properties (e.g., relatively high strength and air permeability), amongst other benefits.

31 Claims, 1 Drawing Sheet

(56) References Cited

U.S. PATENT DOCUMENTS

| | | |
|---|---|---|
| 5,672,399 A | 9/1997 | Kahlbaugh et al. |
| 5,725,821 A | 3/1998 | Gannon et al. |
| 5,731,080 A | 3/1998 | Cousin et al. |
| 5,785,725 A | 7/1998 | Cusick et al. |
| 5,958,320 A | 9/1999 | Pitowski et al. |
| 5,983,469 A | 11/1999 | Beaty et al. |
| 5,997,618 A | 12/1999 | Schneider et al. |
| 6,001,639 A | 12/1999 | Schulein et al. |
| 6,042,769 A | 3/2000 | Gannon et al. |
| 6,159,601 A | 12/2000 | Pitowski et al. |
| 6,171,684 B1 | 1/2001 | Kahlbaugh et al. |
| 6,221,487 B1 | 4/2001 | Luo et al. |
| 6,235,392 B1 | 5/2001 | Luo et al. |
| 6,387,690 B1 | 5/2002 | Schulein et al. |
| 6,419,839 B1 | 7/2002 | Cox et al. |
| 6,511,930 B1 | 1/2003 | Luo et al. |
| 6,596,033 B1 | 7/2003 | Luo et al. |
| 6,660,172 B2 | 12/2003 | Koslow |
| 6,692,827 B2 | 2/2004 | Luo et al. |
| 6,706,876 B2 | 3/2004 | Luo et al. |
| 6,855,531 B2 | 2/2005 | Schulein et al. |
| 6,872,311 B2 * | 3/2005 | Koslow ............. A61L 2/0017 210/500.1 |
| 6,939,492 B2 | 9/2005 | Jackson et al. |
| 7,008,465 B2 | 3/2006 | Graham et al. |
| 7,052,532 B1 | 5/2006 | Liu et al. |
| 7,137,510 B1 | 11/2006 | Klein et al. |
| 7,214,727 B2 | 5/2007 | Kwon et al. |
| 7,226,773 B2 | 6/2007 | Schulein et al. |
| 7,228,973 B2 | 6/2007 | Simon |
| 7,244,497 B2 | 7/2007 | Hartmann et al. |
| 7,296,691 B2 | 11/2007 | Koslow |
| 7,314,497 B2 | 1/2008 | Kahlbaugh et al. |
| 7,390,343 B2 | 6/2008 | Tepper et al. |
| 7,445,737 B2 | 11/2008 | Sanderson et al. |
| 7,534,379 B2 | 5/2009 | Ellison et al. |
| 7,534,380 B2 | 5/2009 | Ellison et al. |
| 7,655,112 B2 | 2/2010 | Koslow |
| 7,670,678 B2 | 3/2010 | Phan |
| 8,012,312 B2 | 9/2011 | Goto et al. |
| 8,833,567 B2 | 9/2014 | Stanfel et al. |
| 8,882,876 B2 | 11/2014 | Battenfeld et al. |
| 9,027,765 B2 | 5/2015 | Battenfeld et al. |
| 9,511,330 B2 | 12/2016 | Yu et al. |
| 2002/0037407 A1 | 3/2002 | Luo et al. |
| 2002/0187701 A1 | 12/2002 | Healey |
| 2003/0054539 A1 | 3/2003 | Schulein et al. |
| 2003/0141261 A1 | 7/2003 | Koslow |
| 2003/0168401 A1 | 9/2003 | Koslow |
| 2003/0177909 A1 * | 9/2003 | Koslow ............. A61L 2/0017 96/154 |
| 2004/0043243 A1 | 3/2004 | Chen et al. |
| 2004/0178142 A1 | 9/2004 | Koslow |
| 2004/0232067 A1 | 11/2004 | Simon |
| 2005/0011827 A1 | 1/2005 | Koslow |
| 2005/0026526 A1 * | 2/2005 | Verdegan ............. B01D 39/16 442/340 |
| 2005/0051487 A1 | 3/2005 | Koslow |
| 2005/0070003 A1 | 3/2005 | Schulein et al. |
| 2005/0142973 A1 * | 6/2005 | Bletsos ............. B32B 5/26 442/340 |
| 2005/0216075 A1 | 9/2005 | Wang et al. |
| 2006/0102871 A1 | 5/2006 | Wang et al. |
| 2006/0134411 A1 | 6/2006 | Mackey et al. |
| 2006/0249705 A1 | 11/2006 | Wang et al. |
| 2007/0017075 A1 | 1/2007 | Nguyen |
| 2007/0017076 A1 | 1/2007 | Nguyen et al. |
| 2007/0039300 A1 | 2/2007 | Kahlbaugh et al. |
| 2007/0154510 A1 | 7/2007 | Wilcher et al. |
| 2007/0232178 A1 | 10/2007 | Polat et al. |
| 2007/0232179 A1 | 10/2007 | Polat et al. |
| 2007/0251624 A1 | 11/2007 | Han et al. |
| 2007/0266503 A1 | 11/2007 | Schmidt-Forst et al. |
| 2008/0020205 A1 | 1/2008 | Fink et al. |
| 2008/0022645 A1 * | 1/2008 | Skirius ............. A47C 31/007 55/524 |
| 2008/0105626 A1 | 5/2008 | Jones et al. |
| 2008/0131471 A1 | 6/2008 | Kolbe et al. |
| 2008/0149561 A1 * | 6/2008 | Chu et al. ............. 210/500.38 |
| 2008/0154225 A1 | 6/2008 | Phan |
| 2008/0241536 A1 | 10/2008 | Luo et al. |
| 2009/0004473 A1 | 1/2009 | Luo |
| 2009/0022960 A1 | 1/2009 | Suer et al. |
| 2009/0022983 A1 | 1/2009 | Cabell et al. |
| 2009/0025894 A1 | 1/2009 | Barnholtz et al. |
| 2009/0042475 A1 | 2/2009 | Pourdeyhimi |
| 2009/0050578 A1 | 2/2009 | Israel et al. |
| 2009/0078640 A1 | 3/2009 | Chu et al. |
| 2009/0087475 A1 | 4/2009 | Sheehan |
| 2009/0123525 A1 | 5/2009 | Bedard |
| 2009/0165969 A1 | 7/2009 | Luo |
| 2009/0218056 A1 | 9/2009 | Manifold et al. |
| 2009/0218057 A1 | 9/2009 | Manifold et al. |
| 2009/0218058 A1 | 9/2009 | Manifold et al. |
| 2009/0218063 A1 | 9/2009 | Manifold et al. |
| 2009/0220731 A1 | 9/2009 | Manifold et al. |
| 2009/0220741 A1 | 9/2009 | Manifold et al. |
| 2009/0220769 A1 | 9/2009 | Manifold et al. |
| 2009/0227975 A1 | 9/2009 | Dougherty et al. |
| 2009/0232920 A1 | 9/2009 | Lozano et al. |
| 2009/0246447 A1 | 10/2009 | Luo |
| 2009/0269429 A1 | 10/2009 | Lozano et al. |
| 2009/0321028 A1 | 12/2009 | Takaoka et al. |
| 2009/0324926 A1 | 12/2009 | Luo |
| 2010/0044289 A1 | 2/2010 | Koslow |
| 2010/0065236 A1 | 3/2010 | Henriksson et al. |
| 2010/0187171 A1 | 7/2010 | Gupta |
| 2010/0252426 A1 | 10/2010 | Tsukuda et al. |
| 2010/0252510 A1 | 10/2010 | Godsay et al. |
| 2010/0314333 A1 | 12/2010 | Witsch et al. |
| 2010/0319543 A1 | 12/2010 | Witsch et al. |
| 2010/0326902 A1 | 12/2010 | Midkiff et al. |
| 2011/0049041 A1 | 3/2011 | Yonemoto |
| 2011/0114276 A1 | 5/2011 | Cordova et al. |
| 2011/0168622 A1 | 7/2011 | Lucas |
| 2011/0259813 A1 | 10/2011 | Wertz et al. |
| 2012/0085567 A1 | 4/2012 | Lintz et al. |
| 2012/0097032 A1 | 4/2012 | Witsch et al. |
| 2012/0132381 A1 | 5/2012 | Hentze et al. |
| 2012/0152859 A1 | 6/2012 | Battenfeld et al. |
| 2013/0233789 A1 | 9/2013 | Parker |
| 2013/0340398 A1 | 12/2013 | Battenfeld et al. |
| 2013/0340613 A1 | 12/2013 | Krupnikov et al. |
| 2013/0341290 A1 | 12/2013 | Yu et al. |
| 2014/0123613 A1 | 5/2014 | Le Port et al. |
| 2014/0224727 A1 | 8/2014 | Yu et al. |
| 2015/0107208 A1 | 4/2015 | Battenfeld et al. |
| 2015/0321124 A1 | 11/2015 | Battenfeld et al. |

FOREIGN PATENT DOCUMENTS

| | | |
|---|---|---|
| DE | 10 2009 006 583 A1 | 6/2010 |
| EP | 0 572 569 B1 | 12/1994 |
| EP | 0 898 316 A1 | 2/1999 |
| EP | 1 493 753 A1 | 1/2005 |
| EP | 0 815 209 B1 | 1/2006 |
| EP | 1 849 896 A1 | 10/2007 |
| WO | WO 96/29397 A1 | 9/1996 |
| WO | WO 97/23669 A1 | 7/1997 |
| WO | WO 98/007911 A1 | 2/1998 |
| WO | WO 99/45875 A1 | 9/1999 |
| WO | WO 00/066820 A1 | 11/2000 |
| WO | WO 01/086043 A1 | 11/2001 |
| WO | WO 03/033806 A2 | 4/2003 |
| WO | WO 03/063996 A2 | 8/2003 |
| WO | WO 03/064006 A1 | 8/2003 |
| WO | WO 04/026958 A1 | 4/2004 |
| WO | WO 2005/001174 A1 | 1/2005 |
| WO | WO 05/009589 A1 | 2/2005 |
| WO | WO 05/016208 A1 | 2/2005 |
| WO | WO 2005/017247 A2 | 2/2005 |
| WO | WO 2005/040495 A1 | 5/2005 |
| WO | WO 05/072950 A1 | 8/2005 |

(56) References Cited

FOREIGN PATENT DOCUMENTS

| WO | WO 06/007020 A1 | 1/2006 |
|---|---|---|
| WO | WO 2006/083668 A3 | 8/2006 |
| WO | WO 2006/083796 A2 | 8/2006 |
| WO | WO 2007/089230 A2 | 8/2007 |
| WO | WO 07/112916 A1 | 10/2007 |
| WO | WO 07/113772 A1 | 10/2007 |
| WO | WO 2007/120342 A2 | 10/2007 |
| WO | WO 09/006206 A1 | 1/2009 |
| WO | WO 09/006207 A1 | 1/2009 |
| WO | WO 09/059342 A1 | 5/2009 |
| WO | WO 2009/061575 A1 | 5/2009 |
| WO | WO 09/088635 A2 | 7/2009 |
| WO | WO 2009/107024 A1 | 9/2009 |
| WO | WO 2009/117356 A1 | 9/2009 |
| WO | WO 2009/117361 A1 | 9/2009 |
| WO | WO 2009/117363 A1 | 9/2009 |
| WO | WO 09/123899 A2 | 10/2009 |
| WO | WO 2010/008621 A1 | 1/2010 |
| WO | WO 2011/134939 A1 | 11/2011 |
| WO | WO 2012/124652 A1 | 9/2012 |
| WO | WO 2013/132161 A2 | 9/2013 |

OTHER PUBLICATIONS

The Law Dictionary, "What is Mullen Burst Test", Accessed Jun. 30, 2015.*
2008, Presentation to 2008 TAPPI Nanotechnology Conference, Honnonoff et al. for Weaver Engineered Fibers Technology, LLC Shelton, CT (Year: 2008).*
International Preliminary Report on Patentability for PCT/US2013/046736 dated Dec. 31, 2014.
International Preliminary Report on Patentability for PCT/US2013/046752 dated Dec. 31, 2014.
Invitation to Pay Additional Fees for PCT/US2014/071547 dated Mar. 12, 2015.
International Preliminary Report on Patentability PCT/US2011/065484 dated Jun. 27, 2013.
International Search Report and Written Opinion for PCT/US2013/046736 dated Nov. 12, 2013.
International Search Report and Written Opinion for PCT/US2013/046752 dated Nov. 5, 2013.
Ragauskas et al., A nano perspective of cellulose. School of Chemistry and Biochemistry Institute of Paper Science and Technology Georgia Institute of Technology. Feb. 2007. PowerPoint. 24 pages.
International Search Report and Written Opinion for PCT/US2013/074261 dated Apr. 14, 2014.
U.S. Appl. No. 12/971,432, filed Dec. 17, 2010, Battenfeld et al.
U.S. Appl. No. 13/528,766, filed Jun. 20, 2012, Battenfeld et al.
U.S. Appl. No. 13/528,774, filed Jun. 20, 2012, Yu et al.
PCT/US2011/065484, mailed Apr. 20, 2012, International Search Report and Written Opinion.
International Search Report and Written Opinion for PCT/US2011/065484 dated Apr. 20, 2012.
Boldizar et al., Prehydrolyzed cellulose as reinforcing filler for thermoplastics. Int J Polymeric Mat. 1987;4:229-62.
Burger et al., Nanofibrous materials and their applications. Annu. Rev. Mater. Res. 2006;36:333-68.
Chinga-Carrasco et al., Cellulose fibres, nanofibrils and microfibrils: the morphological sequence of MFC components from a plant physiology and fibre technology point of view. Nanoscale Res Lett. 2011;6:417-423.
Garcia De Rodriguez et al., Sisal cellulose whiskers reinforced polyvinyl acetate nanocomposites. Cellulose. 2006;13:261-70.
Henriksson et al., Cellulose nanopaper structures of high toughness. Biomacromolecules. 2008;9:1579-85.
Henriksson et al., Structure and properties of cellulose nanocomposite films containing melamine formaldehyde. J. Appl. Sci. 2007;106:2817-24.
Nakagaito et al., Novel high-strength bicomposites based on microfibrillated cellulose having nano-order unit web-like network structure. Appl. Phys. A. 2005;80:155-9.
Nakagaito et al., The effect of morphological changes from pulp fiber towards nano-scale fibrillated cellulose on the mechanical properties of high-strength pint fiber based composites. Appl. Phys A. 2004;78:547-52.
Nordqvist et al., Ehancement of the wet properties of transparent chitosan-acetic-acid-salt films using microfibrillated cellulose. Biomacromolec. 2007;8:2398-403.
Siro et al., Microfibrillated cellulose and new nanocomposite materials: a review. Cellulose. 2010;17:459-94.
Svagan et al., Biomimetic foams of high mechanical performance based on nanostructured cell walls reinforced by native cellulose nanofibrils. Adv. Mater. 2008;20:1263-9.
Svagan et al., Biomimetic polysaccharide nanocomposites of high cellulose content and high toughness. Biomacromolecules. 2007;8:2556-63.
Teague et al., Cellulose nanomaterials—come and get it! Ahead of the Curve. Dec. 12, 2012. http://www.tappi.org/content/enewsletters/ahead/2012/issues/2012-12-12.html?utm_source=Informz&utm_medium=email&utm_campaign=Email.
Zimmermann et al., Cellulose fibrils for polymer reinforcement. Adv. Eng. Mater. 2004;6(9):754-61.
Extended European Search Report for EP11849727.0 dated Feb. 10, 2016.
Partial Supplementary European Search Report for EP13807320.0 dated Feb. 3, 2016.
Partial Supplementary European Search Report for EP13807376.2 dated Feb. 3, 2016.
International Preliminary Report on Patentability for PCT/US2013/074261 dated Jun. 25, 2015.
International Search Report and Written Opinion for PCT/US2014/071547 dated May 29, 2015.
U.S. Appl. No. 15/296,085, filed Oct. 18, 2016, Yu et al.

* cited by examiner

FIBER WEBS COATED WITH FIBER-CONTAINING RESINS

FIELD OF INVENTION

The present embodiments relate generally to fiber webs, and specifically, to fiber webs that are coated with a resin containing fibers.

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust particles, soot particles) contained within the fluid may be trapped on or in the fiber web. Depending on the application, the filter media may be designed to have different performance characteristics.

In some applications, fiber webs may be coated with a resin. Although many coated fiber webs exist, improvements in the physical and/or performance characteristics of the fiber web (e.g., strength, air permeability, and dust holding capacity) would be beneficial.

SUMMARY OF THE INVENTION

Fiber webs that are coated with a resin containing fibers, and related components, systems, and methods associated therewith are provided. The subject matter of this application involves, in some cases, interrelated products, alternative solutions to a particular problem, and/or a plurality of different uses of structures and compositions.

In one set of embodiments, a series of articles is provided. In one embodiment, an article comprises a non-woven web comprising a plurality of fibers, and a coating that coats at least a portion of the non-woven web, wherein the coating comprises a plurality of fibrillated fibers distributed within a resin.

In another embodiments, an article comprises a non-woven web comprising a plurality of fibers, and a coating that coats at least a portion of the non-woven web, wherein the coating comprises a plurality of non-conductive nanofibers distributed within a resin.

In another set of embodiments, a series of methods are provided. In one embodiment, a method comprises providing a non-woven web comprising a plurality of fibers and coating at least a portion of the non-woven web with a coating that comprises a plurality of fibrillated fibers distributed within a resin.

In another embodiment, a method comprises providing a non-woven web comprising a plurality of fibers and coating at least a portion of the non-woven web with a coating that comprises a plurality of non-conductive nanofibers distributed within a resin.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Fiber webs that may be coated and used in filter media are provided. In some embodiments, the fiber web is a non-woven web that is coated with a resin comprising fibrillated fibers. The fibrillated fibers may include, for example, fibrillated cellulose fibers. The fibrillated fibers may have sizes (e.g., diameters) in the nano or micron range. The fibrillated fibers may be distributed within the resin, and the resin may coat at least a portion of the non-woven web. In certain embodiments, the resin may include nanofibers (e.g., fibrillated or non-fibrillated nanofibers). The respective characteristics and amounts of the fibers in the resin may be selected to impart desirable properties including enhanced mechanical properties and filtration properties (e.g., relatively high strength and air permeability), amongst other benefits. Filter media formed of the webs may be particularly well-suited for applications that involve filtering fuel, though the media may also be used in other applications (e.g., air).

Figure 1A:
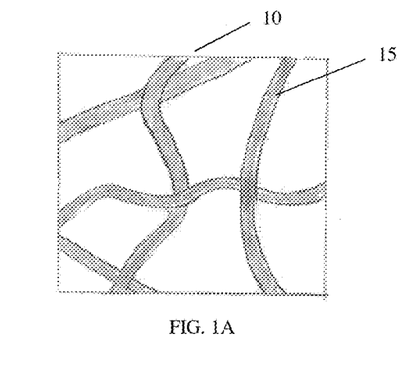
FIG. 1A is a schematic diagram showing a cross section of a fiber web including a plurality of fibers according to one set of embodiments.
Figure 1B:
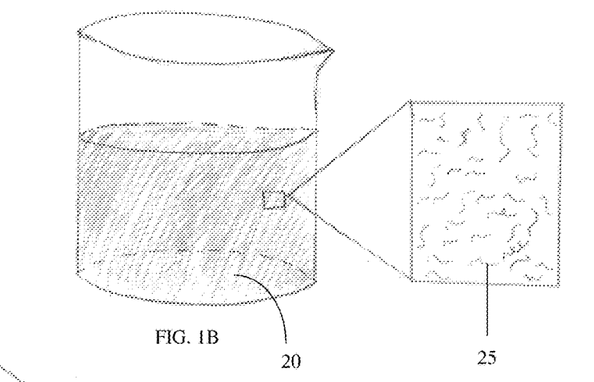
FIG. 1B is a schematic diagram showing a resin containing fibers distributed therein according to one set of embodiments.
Figure 1C:
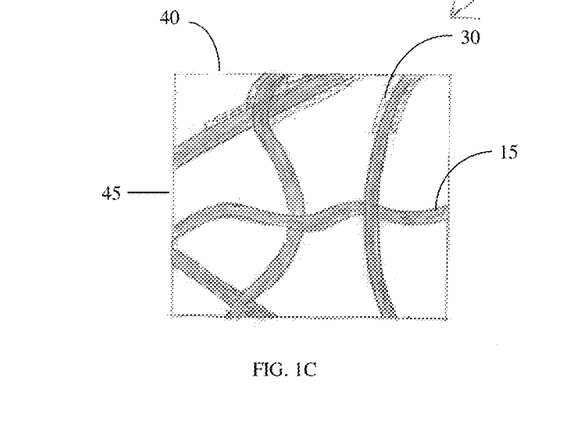
FIG. 1C is a schematic diagram showing a cross section of a fiber web having a surface coated with the resin of FIG. 1B according to one set of embodiments.
Figure 1D:
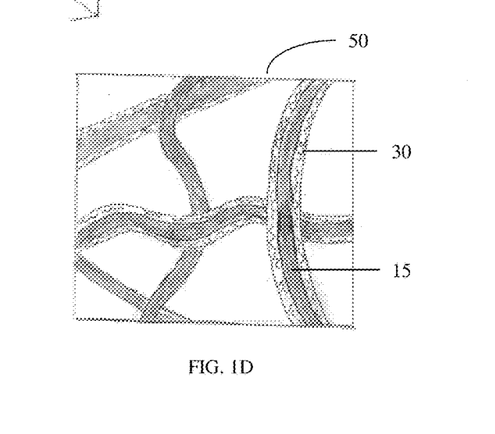
FIG. 1D is a schematic diagram showing a cross section of a fiber web including fibers coated with the resin of FIG. 1B according to one set of embodiments.

An example of a fiber web that is coated with a resin is shown in FIGS. 1C-1D. As shown illustratively in FIG. 1A, a fiber web 10, shown in cross-section, may include a plurality of fibers 15. All or portions of the fiber web may be coated with a resin 20, which is shown illustratively in FIG. 1B. In some embodiments, the resin may contain a plurality of fibers 25 (e.g., fibrillated fibers) distributed therein. The resin, with fibers distributed within, may remain on the fiber web after the fiber web has been coated and dried. For example, in one embodiment, as shown illustratively in FIG. 1C, a coating 30 may be formed on a surface 40 of the fiber web. In other embodiments, as shown illustratively in FIG. 1D, a resin may be applied to the fiber web to produce a coating 30 on at least a portion of the fibers in the interior of the fiber web (i.e., through the thickness of the fiber web). In certain embodiments, substantially all of the fibers of the fiber web may be coated with the resin. However, in some embodiments, not all fibers are coated. The extent of the coating may vary. In some cases, the coating covers the entire fiber; though, in other cases, only a portion of the fibers is coated. In some embodiments, the coated fiber webs 45 and 50, shown in FIGS. 1C and 1D, respectively, may be used as filter media and may have enhanced mechanical and/or filtration properties as described herein.

In some embodiments, the resin used to form a coating on a fiber web described herein may be a water-based resin (e.g., a water-based polymeric resin). Non-limiting examples of water-based polymer resins include acrylic resins, stryene resins, polyvinyl alcohol resins, vinyl acetate resins, and combinations thereof. It should be appreciated that any suitable water-based polymeric resin may be utilized. In certain embodiments, the resin used to form a coating on a fiber web may be a solvent-based resin (e.g., an organic solvent-based polymeric resin). Organic solvents include, for example, methanol, ethanol, acetone, other aliphatic alcohols, aromatic alcohols, aromatic ketones, esters, reactive diluents, nitrile solvents, ethers, chlorinated solvents, aliphatic solvents, amide solvents, lactam solvents, sulfoxides, sulfone solvents, acid and acid anhydride solvents, carbon dioxide, and carbon disulfide. Non-limiting examples of organic solvent-based resins include resole, novolac polyesters, polyamides, polyphenols, polyepoxides, polyurethanes, polycarbonates, polyterpenes, furan polymers, polyimides, and combinations thereof. In some embodiments, resins including mixtures of water and organic solvents (e.g., water-miscible organic solvents) can be used.

In some embodiments, the resin includes a cure agent. Any suitable cure agent can be used. Non-limiting examples of cure agents include hexamethylene tetramine, terpene phenolic, bismaleimides, cyanate esters, methylol melamine, methylol urea, isocyanate resins, and combinations thereof.

In some instances, a single type of fiber is distributed within the resin. For example, the fibers may be fibrillated cellulose fibers (e.g., with an average fiber diameter in the nanometer or micrometer range). In other instances, the resin may include a mixture of fiber types (i.e., more than one fiber type). When the resin includes more than one fiber type, the fibers may differ based on certain characteristics such as average fiber diameter, fiber composition, level of fibrillation, average fiber length, and/or conductivity. For example, the resin may include a first plurality of fibers comprising fibrillated fibers having a first average diameter, and a second plurality of fibers comprising fibrillated fibers having a second average diameter, wherein the first and second average diameters are different. In another example, the resin may include a first plurality of fibers comprising fibrillated fibers having a first level of fibrillation, and a second plurality of fibers comprising fibrillated fibers having a second level of fibrillation, wherein the first and second levels of fibrillation are different. Examples of suitable fibers that can be distributed in the resin are described in more detail below. In some embodiments, the fibers may be dispersed within the resin.

The resin may have any suitable weight percentage of fibers (e.g., fibrillated fibers) distributed therein. For instance, in some embodiments, the weight percentage of fibers in the resin may be greater than or equal to about 0.25 wt %, greater than or equal to about 0.5 wt %, greater than or equal to about 1 wt %, greater than or equal to about 2 wt %, greater than or equal to about 4 wt %, greater than or equal to about 6 wt %, or greater than or equal to about 8 wt %. In some instances, the weight percentage of fibers in the resin may be less than or equal to about 10 wt %, less than or equal to about 7 wt %, less than or equal to about 5 wt %, less than or equal to about 3 wt %, less than or equal to about 1 wt %, or less than or equal to about 0.5 wt %. Combinations of the above-referenced ranges are also possible (e.g., greater than or equal to about 0.5 wt % and less than or equal to about 5 wt %). Other values of weight percentage of fibers in the resin are also possible. The weight percentage of fibers in the resin is based on the dry resin solids and can be determined prior to coating the fiber web.

In some embodiments, the resin used to coat the fiber web may include other components such as additives. For instance, in some cases, the resin may include one or more of a viscosity modifier (e.g., acrylic acid), a water repellant (e.g., a long hydrocarbon chained molecule and/or a fluorine-containing molecule), a cross-linker (e.g., urea-formaldehyde), and/or pH adjuster (e.g., ammonia). In one example, fibrillated cellulose fibers may be distributed in a water-based polymeric resin including a viscosity modifier, a water repellant, a cross-linker, and a pH adjuster.

To form a resin containing distributed fibers, the fibers to be included in the resin may first be added in a specific amount to an aqueous solution or suspension (e.g., water). A resin (and any optional additives) may then be combined and mixed with the aqueous solution or suspension containing the fibers. It should be understood that this method of resin formulation is not limiting and other methods of resin formulation are possible.

A resin containing fibers distributed therein may be added to the fiber web in any suitable manner (e.g., in the wet state or in the dry state) after the fiber web is formed. Any suitable coating method may be used to form a coating on the fiber web. In some embodiments, the resin may be applied to the fiber web using a non-compressive coating technique. The non-compressive coating technique may coat the fiber web, while not substantially decreasing the thickness of the web. In other embodiments, the resin may be applied to the fiber web using a compressive coating technique. Non-limiting examples of coating methods include the use of a slot die coater, gravure coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, lab coating, melt coating, dip coating, knife roll coating, spin coating, spray coating, and saturation impregnation. Other coating methods are also possible.

In size press coating, a gap is provided between rotating cylinders of a size press so that compression of the fiber web is limited. A resin is applied by shower to the rolls, which then coat the fiber web. In gravure coating, a gravure is used to apply a coating. A gravure is a roll with a cell pattern engraved on the surface. As the roll passes through a trough containing the resin, resin is trapped in the cells and delivered to the fiber web, which wicks the resin out of the gravure roll. The amount of the resin impregnated into the fiber web typically depends on the viscosity, solids content, and absorption rate of fiber web.

The film press method may be used to coat a top or bottom surface of the fiber web. A film press coater is a type of size press coater. The film press typically comprises two (sometimes three) small diameter rolls on each side of the size press cylinders that are called gate rolls. The gate rolls control the mixture film thickness on the transfer cylinder. The transfer cylinder applies a film of resin to a desired surface (e.g., top or bottom). A second cylinder can be used to press the web onto the transfer cylinder, but it is not required. Web tension may be used to maintain intimate contact between the transfer roll and the web. Such a technique may be used, for example, to coat at least one surface of the fiber web without the resin permeating throughout the fiber web.

In a lab coating, the fiber web is soaked in the resin for a predetermined period of time to allow for resin absorption. The fiber web is then run through the lab coater to squeeze out extra resin in order to obtain a specific amount of resin absorption. The lab coater includes two parallel rolls, one on top of another, with a gap between them. The bottom roll is a driven roll such that when the fiber web is passed through gap, the top roll turns. The gap is set for a specified thickness for the fiber web. The fiber web may then be placed on a photo dryer to remove the remaining moisture from the resin-saturated web.

After applying the resin to the fiber web, the resin may be dried by any suitable method. Non-limiting examples of drying methods include the use of a photo dryer, infrared dryer, hot air oven steam-heated cylinder, or any suitable type of dryer familiar to those of ordinary skill in the art.

The resin may coat any suitable portion of the non-woven web. In some embodiments, the coating of resin may be formed such that the surfaces of the non-woven web are coated without substantially coating the interior of the non-woven web. In some instances, a single surface of the non-woven web may be coated. For example, a top surface or layer of the non-woven web may be coated. In other instances, more than one surface or layer of the non-woven web may be coated (e.g., the top and bottom surfaces or layers). In other embodiments, at least a portion of the interior of the non-woven web may be coated without substantially coating at least one surface or layer of the non-woven web. For example, a middle layer of a fiber web may be coated, but one or more layers adjacent to the middle layer may not be coated. The coating may also be formed such that at least one surface or layer of the non-woven web and the interior of the non-woven web are coated. In some embodiments, the entire web is coated with the resin.

In some embodiments, at least a portion of the fibers of the non-woven web may be coated without substantially blocking the pores of the non-woven web. In some instances, substantially all of the fibers may be coated without substantially blocking the pores. Coating the fibers of the web using the resins described herein may add strength to the fiber web, and leaving the pores substantially unblocked may be important for maintaining or improving certain filtration properties such as air permeability.

In some embodiments, the fiber web may include more than one coating (e.g., on different surfaces of the fiber web). In some cases, the same coating method may be utilized to apply more than one coating. For example, the same coating method may be used to form a first coating on a top surface and a second coating on a bottom surface of the fiber web. In other instances, more than one coating method may be used to apply more than one coating. For example, a first coating method may be used to form a first coating in the interior of the fiber web and a second coating method may be used to form a second coating on a bottom surface of the fiber web. When more than one coating exists on a fiber web, in some embodiments the coatings may have the same resin composition. In other embodiments, the resin compositions may differ with respect to certain properties (e.g., types of fibers, weight percentage of fibers, average fiber diameter, average fiber length, resin type).

In some embodiments, the coating (i.e., resin), may be a measurable weight percentage of the entire fiber web. For instance, in some embodiments, the weight percentage of the coating in the entire fiber web may be greater than or equal to about 5 wt %, greater than or equal to about 10 wt %, greater than or equal to about 15 wt %, greater than or equal to about 18 wt %, greater than or equal to about 25 wt %, greater than or equal to about 35 wt %, or greater than or equal to about 45 wt %. In some instances, the weight percentage of the coating in the entire fiber web may be less than or equal to about 50 wt %, less than or equal to about 40 wt %, less than or equal to about 35 wt %, less than or equal to about 25 wt %, less than or equal to about 20 wt %, or less than or equal to about 15 wt %. Combinations of the above-referenced ranges are also possible (e.g., greater than or equal to about 18 wt % and less than or equal to about 25 wt %). Other values of weight percentage of the coating in the entire fiber web are also possible. The weight percentage of resin in the entire fiber web is determined after the resin has been dried.

In some embodiments, the fibers within the coating (i.e., resin), may be a measurable weight percentage of the entire fiber web. For instance, in some embodiments, the weight percentage of the fibers in the coating in the entire fiber web may be greater than or equal to about 0.06 wt %, greater than or equal to about 0.1 wt %, greater than or equal to about 0.3 wt %, greater than or equal to about 0.6 wt %, greater than or equal to about 1 wt %, greater than or equal to about 2 wt %, or greater than or equal to about 4 wt %. In some instances, the weight percentage of the fibers in the coating in the entire fiber web may be less than or equal to about 5 wt %, less than or equal to about 3 wt %, less than or equal to about 1 wt %, less than or equal to about 0.6 wt %, less than or equal to about 0.2 wt %, or less than or equal to about 0.1 wt %. Combinations of the above-referenced ranges are also possible (e.g., greater than or equal to about 0.1 wt % and less than or equal to about 1 wt %). Other values of weight percentage of the fibers in the coating in the entire fiber web are also possible. The weight percentage of fibers in the coating in the entire fiber web is determined after the resin has been dried.

In certain embodiments, the coating may have an average thickness on the fibers of the web. For instance, in some embodiments, the coating may have an average thickness of greater than or equal to about 0.1 microns, greater than or equal to about 1 micron, greater than or equal to about 5 microns, greater than or equal to about 10 microns, greater than or equal to about 20 microns, greater than or equal to about 30 microns, or greater than or equal to about 40 microns. In some instances, the coating may have an average thickness of less than or equal to about 50 microns, less than or equal to about 35 microns, less than or equal to about 25 microns, less than or equal to about 15 microns, less than or equal to about 1 microns, or less than or equal to about 0.5 microns. Combinations of the above-referenced ranges are also possible (e.g., a thickness of greater than or equal to about 1 microns and less than or equal to about 25 microns). Other values of thickness are also possible. The thickness may be determined according to the examination of a cross-section of a fiber or fiber web magnified under scanning-electron microscope or other similar instrument in which the resin coating is visible around the fiber. The thickness may also be estimated based on known parameters of the resin.

In some embodiments, the fibers in a resin may be cellulose fibers, regenerated cellulose fibers, synthetic fibers, or a combination thereof. Such fibers may be optionally fibrillated, as described herein. For instance, in some embodiments, the resin may include one or more cellulose fibers, such as softwood fibers, hardwood fibers, a mixture of hardwood and softwood fibers, regenerated cellulose fibers, and mechanical pulp fibers (e.g., groundwood, chemically treated mechanical pulps, and thermomechanical pulps). Exemplary softwood fibers include fibers obtained from mercerized southern pine (e.g., mercerized southern pine fibers or "HPZ fibers", "HPZ XS fibers," and "HPZ III fibers" or "Porosanier fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers, HPZ XS, and HPZ III can be obtained from Buckeye Technologies, Inc., Memphis, Tenn.; Porosanier fibers can be obtained from Rayonier, Inc., Jacksonville, Fla.; Robur Flash fibers can be obtained from Rottneros AB, Stockholm, Sweden; Chinook fibers can be obtained from Domtar Corp., Montreal, QC; Brunswick pine and Leaf River fibers can be obtained from Georgia-Pacific, Atlanta, Ga.; and Tarascon fibers can be obtained from Paper Excellence, Vancouver, BC, Canada ("Tarascon fibers"). Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers") and (2) Group Portucel Soporcel, Cacia, Portugal ("Cacia fibers"). Other exemplary hardwood fibers may be obtained from New Page Corp., Miamisburg, Ohio ("Pinnacle Prime fibers"). The fibers may optionally be fibrillated to varying degrees, e.g., within ranges of the CSF values described herein.

In certain embodiments, the cellulose fibers may include amorphous regions, crystalline regions, or both amorphous and crystalline regions. As known to those of ordinary skill in the art, a crystalline region occurs in a cellulose fiber when the glucose polymers within the fiber exhibit long range order. The glucose polymers in an amorphous region are less ordered. Crystalline regions are generally more resistant to chemical reaction than the less ordered amorphous region. Pure crystalline cellulose fibers (i.e., 100% crystalline cellulose) are typically smaller in fiber diameter (e.g., 10-100 times smaller) and have a significantly lower level of fibrillation compared to cellulose fibers that contain amorphous regions. In some instances, the resin that coats at least a portion of the fiber web may include fibrillated cellulose fibers with both amorphous and crystalline regions. Resins including fibrillated cellulose fibers with only amorphous regions (e.g., 100% amorphous regions) or only crystalline regions (e.g., 100% crystalline regions) are also possible. Those of ordinary skill in the art can determine whether cellulose fibers includes amorphous regions and/or crystalline regions by observation (e.g., X-ray diffraction).

In some embodiments, the resin that coats at least a portion of the fiber web may include one or more synthetic fibers. Synthetic fibers may include any suitable type of synthetic polymer. Non-limiting examples of suitable synthetic polymers include polyester, polycarbonate, polyamide, polyaramid, polyimide, polyethylene, polypropylene, polyether ether ketone, polyethylene terephthalate, polyolefin, nylon, acrylics, polyvinyl alcohol, liquid crystalline polymers, polyoxazole (e.g., poly(p-phenylene-2,6-benzobisoxazole)), regenerated cellulose (e.g., lyocell, rayon), and combinations thereof. In some embodiments, the synthetic fibers are organic polymer fibers. In certain embodiments, the synthetic fibers are staple fibers. In some cases, synthetic fibers may include meltblown fibers, which may be formed of polymers described herein (e.g., polyester, polypropylene). In other cases, the synthetic fibers may be electrospun fibers or fibers formed by centrifugal spinning. The synthetic fibers may optionally be fibrillated to varying degrees, e.g., within ranges of the CSF values described herein.

It should be understood that, in certain embodiments, the fibers in the resin may have compositions other than those described above.

As described herein, the resin coating all or portions of a fiber web may contain fibrillated fibers distributed therein. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a high surface area and can increase the number of contact points between the fibrillated fibers and the fibers in the fiber web. Such an increase in points of contact between the fibrillated fibers and other fibers and/or components of the web may contribute to enhancing mechanical properties (e.g., flexibility, strength) and/or filtration performance properties of the fiber web.

As noted above, fibrillated fibers include parent fibers and fibrils. In some embodiments the parent fibers may have an average diameter in the micron range. For example, the parent fibers may have an average diameter of greater than or equal to about 1 micron, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. In some embodiments, the parent fibers may have an average diameter of less than or equal to about 75 microns, less than or equal to about 55 microns, less than or equal to about 35 microns, less than or equal to about 25 microns, less than or equal to about 15 microns, less than or equal to about 10 microns, or less than or equal to about 5 microns. Combinations of the above referenced ranges are also possible (e.g., parent fibers having an average diameter of greater than or equal to about 1 micron and less than or equal to about 25 microns). Other ranges are also possible.

In other embodiments, the parent fibers may have an average diameter in the nanometer range. For instance in, some embodiments, the parent fibers may have an average diameter of less than about 1 micron, less than or equal to about 0.8 microns, less than or equal to about 0.5 microns, less than or equal to about 0.1 microns, less than or equal to about 0.05 microns, less than or equal to about 0.02 microns, less than or equal to about 0.01 microns, or less than or equal to about 0.005 microns. In some embodiments the parent fibers may have an average diameter of greater than or equal to about 0.003 microns, greater than or equal to about 0.004 micron, greater than or equal to about 0.01 microns, greater than or equal to about 0.05 microns, greater than or equal to about 0.1 microns, or greater than or equal to about 0.5 microns. Combinations of the above referenced ranges are also possible (e.g., parent fibers having an average diameter of greater than or equal to about 0.004 microns and less than about or equal to about 0.02 microns). Other ranges are also possible.

The average diameter of the fibrils is generally less than the average diameter of the parent fibers. Depending on the average diameter of the parent fibers, in some embodiments, the fibrils may have an average diameter of less than or equal to about 25 microns, less than or equal to about 20 microns, less than or equal to about 10 microns, less than or equal to about 5 microns, less than or equal to about 1 micron, less than or equal to about 0.5 microns, less than or equal to about 0.1 microns, less than or equal to about 0.05 microns, or less than or equal to about 0.01 microns. In some embodiments the fibrils may have an average diameter of greater than or equal to about 0.003 microns, greater than or equal to about 0.01 micron, greater than or equal to about 0.05 microns, greater than or equal to about 0.1 microns, greater than or equal to about 0.5 microns greater than or equal to about 1 micron, greater than or equal to about 5 microns, greater than or equal to about 10 microns, or greater than or equal to about 20 microns. Combinations of the above referenced ranges are also possible (e.g., fibrils having an average diameter of greater than or equal to about 0.01 microns and less than or equal to about 20 microns). Other ranges are also possible.

In some embodiments, the average length of fibrillated fibers may be greater than or equal to about 0.05 microns, greater than or equal to about 0.1 microns, greater than or equal to about 0.5 microns, or greater than or equal to about 1 micron, greater than or equal to about 10 microns, greater than or equal to about 30 microns, greater than or equal to about 100 microns, greater than or equal to about 500 microns, greater than or equal to about 2,000 microns, greater than equal to about 5,000 microns, or greater than or equal to about 9,000 microns. In some instances, the average length of the fibrillated fibers may be less than or equal to about 12,000 microns, less than or equal to about 8,000 microns, less than or equal to about 4,000 microns, less than or equal to about 2,000 microns, less than or equal to about 1,000 microns, less than or equal to about 500 microns, less than or equal to about 100 microns, less than or equal to about 50 microns, less than or equal to about 1 micron, less than or equal to about 0.5 microns, less than or equal to about 0.1 microns, less than or equal to about 0.05 microns. Combinations of the above referenced ranges are also possible (e.g., fibrillated fibers having an average length of greater than or equal to about 30 microns and less than about 2,000 microns). Other ranges are also possible. The average length of the fibrillated fibers refers to the average length of parent fibers from one end to an opposite end of the parent fibers. In some embodiments, the maximum average length of the fibrillated fibers falls within the above-noted ranges. The maximum average length refers to the average of the maximum dimension along one axis of the fibrillated fibers (including parent fibers and fibrils). It should be understood that, in certain embodiments, the fibers and fibrils may have dimensions outside the above-noted ranges.

The level of fibrillation of the fibrillated fibers may be measured according to any number of suitable methods. For example, the level of fibrillation can be measured according to a Canadian Standard Freeness (CSF) test, specified by TAPPI test method T 227 om 09 Freeness of pulp. The test can provide an average CSF value. In some embodiments, the average CSF value of the fibrillated fibers may be greater than or equal to about 0 mL, greater than or equal to about 5 mL, greater than or equal to about 10 mL, greater than or equal to about 30 mL, greater than or equal to about 50 mL, greater than or equal to about 100 mL, greater than or equal to about 150 mL or greater than or equal to about 250 mL. In some instances, the average CSF value of the fibrillated fibers may be less than or equal to about 300 mL, less than or equal to about 250 mL, less than or equal to about 175 mL, less than or equal to about 125 mL, less than or equal to about 75 mL, less than or equal to about 35 mL, or less than or equal to about 15 mL. Combinations of the above-referenced ranges are also possible (e.g., an average CSF value of fibrillated fibers of greater than or equal to about 5 mL and less than or equal to about 35 mL). Other ranges are also possible. The average CSF value of the fibrillated fibers may be based on one type of fibrillated fiber or more than one type of fibrillated fiber.

Fibers may be fibrillated through any appropriate fibrillation refinement process. In some embodiments, fibers are fibrillated using a disc refiner, a stock beater or any other suitable fibrillating equipment.

In some embodiments, nanofibers may be used in lieu of fibrillated fibers in the resin. The nanofibers may be made from a material substantially similar to the material used to form the fibrillated fibers (e.g., cellulose, regenerated cellulose, a synthetic polymer, or a combination thereof). In some embodiments, the nanofibers may be fibrils that have been detached from a parent fiber, e.g., during a fibrillation refinement process. In some instances, the nanofibers may be non-conductive. In certain embodiments, the resin used to coat at least a portion of the fiber web may include a mixture of fibrillated fibers and nanofibers.

In some embodiments, the nanofibers distributed within the resin may have an average diameter of, for example, less than or equal to about 1.0 microns, less than or equal to about 0.8 microns, less than or equal to about 0.6 microns, less than or equal to about 0.4 microns, less than or equal to about 0.2 microns, or less than or equal to about 0.05 microns. In certain embodiments, the nanofibers may have an average diameter of greater than or equal to about 0.001 microns, greater than or equal to about 0.01 microns, greater than or equal to about 0.1 microns, greater than or equal to about 0.3 microns, greater than or equal to about 0.5 microns, or greater than or equal to about 0.8 microns. Combinations of the above-referenced ranges are also possible (e.g., less than or equal to about 1 micron and greater than or equal to about 0.2 microns). Other values of average fiber diameter are also possible.

In some embodiments, the average length of the nanofibers may be selected as desired. For instance, in some embodiments, the average length of the nanofibers may be greater than or equal to about 0.05 microns, greater than or equal to about 0.1 microns, greater than or equal to about 0.5 microns, greater than or equal to about 1 micron, greater than equal to about 10 microns, greater than equal to about 30 microns, greater than equal to about 100 microns, greater than equal to about 500 microns, greater than equal to about 1,000 microns, or greater than or equal to about 2,000 microns. In some instances, the average length of the nanofibers may be less than or equal to about 3,500 microns, less than or equal to about 2,000 microns, less than or equal to about 1,000 microns, less than or equal to about 500 microns, less than or equal to about 100 microns, less than or equal to about 10 microns, less than or equal to about 1 micron, or less than or equal to about 0.1 microns. Combinations of the above referenced ranges are also possible (e.g., nanofibers having an average length of greater than or equal to about 30 microns and less than about 2,000 microns). Other ranges are also possible.

In some embodiments, nanofibers may be distributed in a resin that coats a fiber web (e.g., non-woven web). In certain embodiments, the nanofibers may be non-conductive. The nanofibers may be fibrillated in some instances, and not fibrillated in other instances. In some instances, the nanofibers may be derived from a fibrillation process (e.g., the nanofibers may be the fibrils formed from a fibrillation refinement process that have become detached). However, nanofibers that are not derived from a fibrillation process may also be used.

As described herein, a resin may coat at least a portion of a fiber web (e.g., a non-woven fiber web). The fiber web may include, for example, cellulose fibers, synthetic fibers, glass fibers, or combinations thereof. For instance, in some embodiments, the fiber web may include one or more cellulose fibers, such as softwood fibers, hardwood fibers, a mixture of hardwood and softwood fibers, regenerated cellulose fibers, and mechanical pulp fibers (e.g., groundwood, chemically treated mechanical pulps, and thermomechanical pulps), additional examples of which are described herein. The fiber web may also include combinations of more than one type of cellulose fiber.

In embodiments in which the fiber web includes cellulose fibers, the average diameter of the cellulose fibers in the fiber web may be, for example, greater than or equal to about 1 micron, greater than or equal to about 5 microns, greater than or equal to about 10 microns, greater than or equal to about 20 microns, greater than or equal to about 30 microns, greater than or equal to about 40 microns, greater than or equal to about 50 microns, or greater than or equal to about 60 microns. In some instances, the cellulose fibers may have an average diameter of less than or equal to about 75 microns, less than or equal to about 65 microns, less than or equal to about 55 microns, less than or equal to about 45 microns, less than or equal to about 35 microns, less than or equal to about 25 microns, less than or equal to about 15 microns, or less than or equal to about 5 microns. Combinations of the above-referenced ranges are also possible (e.g., greater than or equal to about 1 micron and less than or equal to about 5 microns). Other values of average fiber diameter are also possible.

In some embodiments, the cellulose fibers may have an average length. For instance, in some embodiments, cellulose fibers may have an average length of greater than or equal to about 0.5 mm, greater than or equal to about 1 mm, greater than or equal to about 3 mm, greater than or equal to about 5 mm, greater than or equal to about 8 mm, greater than or equal to about 10 mm, greater than or equal to about 15 mm, or greater than or equal to about 20 mm. In some instances, cellulose fibers may have an average length of less than or equal to about 25 mm, less than or equal to about 20 mm, less than or equal to about 15 mm, less than or equal to about 10 mm, less than or equal to about 4 mm, or less than or equal to about 1 mm. Combinations of the above-referenced ranges are also possible (e.g., greater than or equal to about 1 mm and less than or equal to about 4 mm). Other values of average fiber length are also possible.

In some embodiments, the fiber web may include a certain weight percentage of cellulose fibers. For example, the weight percentage of cellulose fibers in the fiber web may be greater than or equal to about 0 wt %, greater than or equal to about 20 wt %, greater than or equal to about 40 wt %, greater than or equal to about 60 wt %, greater than or equal to about 85 wt %, or greater than or equal to about 95 wt %. In some instances, the weight percentage of cellulose fibers in the fiber web may be less than or equal to about 100 wt %, less than or equal to about 90 wt %, less than or equal to about 85 wt %, less than or equal to about 75 wt %, less than or equal to about 55 wt %, less than or equal to about 25 wt %, or less than or equal to about 5 wt %. Combinations of the above-referenced ranges are also possible (e.g., greater than or equal to about 85 wt % and less than or equal to about 100 wt %). In some embodiments, the fiber web may be 100 wt % cellulose fibers. Other values of weight percentage of cellulose fibers in the fiber web are also possible.

In embodiments in which the fiber web includes more than one cellulose fiber, the cellulose fibers may be a mixture of hardwood and softwood fibers. For instance, in some embodiments, the weight ratio of softwood fibers to hardwood fibers may be greater than or equal to about 0.01:1, greater than or equal to about 0.1:1, greater than or equal to about 1:1, greater than or equal to about 2:1, greater than or equal to about 10:1, or greater than or equal to about 50:1. In some instances, the weight ratio of softwood fibers to hardwood fibers may be less than or equal to about 99:1, less than or equal to about 60:1, less than or equal to about 20:1, less than or equal to about 5:1, less than or equal to about 1:1, or less than or equal to about 0.1:1. Combinations of the above-referenced ranges are also possible (e.g., greater than or equal to about 0.01:1 and less than or equal to about 20:1). Other values of weight ratio of softwood fibers to hardwood fibers in the fiber web are also possible.

In some embodiments, the fiber web may include one or more synthetic fibers, such as electrospun fibers, meltblown fibers, polyaramid fibers, polyester fibers, polycarbonate fibers, and/or polyamide fibers, additional examples of which are described herein. The synthetic fibers may be continuous or non-continuous (e.g., staple fibers) as described herein. The fiber web may also include combinations of more than one type of synthetic fiber.

In embodiments in which the fiber web includes synthetic fibers, the average diameter of the synthetic fibers in the fiber web may be, for example, greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the synthetic fibers may have an average diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, less than or equal to about 1.5 microns, less than or equal to about 1 micron, less than or equal to about 0.8 microns, or less than or equal to about 0.5 microns. Combinations of the above-referenced ranges are also possible (e.g., greater than or equal to about 1 micron and less than or equal to about 5 microns). Other values of average fiber diameter are also possible.

In some cases, the synthetic fibers may be continuous (e.g., meltblown fibers, spunbond fibers, electrospun fibers, centrifugal spun fibers, etc.). For instance, synthetic fibers may have an average length of greater than or equal to about 1 inch, greater than or equal to about 50 inches, greater than or equal to about 100 inches, greater than or equal to about 300 inches, greater than or equal to about 500 inches, greater than or equal to about 700 inches, or greater than or equal to about 900 inches. In some instances, synthetic fibers may have an average length of less than or equal to about 1000 inches, less than or equal to about 800 inches, less than or equal to about 600 inches, less than or equal to about 400 inches, or less than or equal to about 100 inches. Combinations of the above-referenced ranges are also possible (e.g., greater than or equal to about 50 inches and less than or equal to about 1000 inches). Other values of average fiber length are also possible.

In some embodiments, the synthetic fibers are not continuous (e.g., staple fibers). For instance, in some embodiments, the synthetic fibers in the fiber web may have an average length of greater than or equal to about 0.5 mm, greater than or equal to about 1 mm, greater than or equal to about 3 mm, greater than or equal to about 5 mm, greater than or equal to about 10 mm, greater than or equal to about 15 mm, or greater than or equal to about 20 mm. In some instances, the synthetic fibers may have an average length of less than or equal to about 25 mm, less than or equal to about 20 mm, less than or equal to about 15 mm, less than or equal to about 10 mm, less than or equal to about 6 mm, less than or equal to about 4 mm, or less than or equal to about 2 mm. Combinations of the above-referenced ranges are also possible (e.g., greater than or equal to about 1 mm and less than or equal to about 4 mm). Other values of average fiber length are also possible. In other embodiments, the synthetic fibers may be continuous.

In some embodiments, in which synthetic fibers are included in the fiber web, the weight percentage of synthetic fibers in the fiber web may be greater than or equal to about 1 wt %, greater than or equal to about 5 wt %, greater than or equal to about 25 wt %, greater than or equal to about 40 wt %, greater than or equal to about 55 wt %, greater than or equal to about 70 wt %, or greater than or equal to about 85 wt %. In some instances, the weight percentage of the synthetic fibers in the fiber web may be less than or equal to about 100 wt %, less than or equal to about 90 wt %, less than or equal to about 75 wt %, less than or equal to about 60 wt %, less than or equal to about 35 wt %, less than or equal to about 15 wt %, or less than or equal to about 5 wt %. Combinations of the above-referenced ranges are also possible (e.g., greater than or equal to about 5 wt % and less than or equal to about 15 wt %). Other values of weight percentage of synthetic fibers in the fiber web are also possible. In certain embodiments, the fiber web may include 0 wt % synthetic fibers. In other embodiments, the fiber web may include 100 wt % synthetic fibers.

In some embodiments, the fiber web may include one or more glass fibers (e.g., microglass fibers, chopped strand glass fibers, or a combination thereof). Microglass fibers and chopped strand glass fibers are known to those skilled in the art. One skilled in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

The microglass fibers may have small diameters. For instance, in some embodiments, the average diameter of the microglass fibers may be less than or equal to about 9 microns, less than or equal to about 7 microns, less than or equal to about 5 microns, less than or equal to about 3 microns, or less than or equal to about 1 micron. In some instances, the microglass fibers may have an average fiber diameter of greater than or equal to about 0.1 microns, greater than or equal to about 0.3 microns, greater than or equal to about 1 micron, greater than or equal to about 3 microns, or greater than or equal to about 7 microns. Combinations of the above-referenced ranges are also possible (e.g., greater than or equal to about 0.1 microns and less than or equal to about 9 microns). Other values of average fiber diameter are also possible. Average diameter distributions for microglass fibers are generally log-normal. However, it can be appreciated that microglass fibers may be provided in any other appropriate average diameter distribution (e.g., Gaussian distribution).

In some embodiments, the average length of microglass fibers may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than or equal to about 6 mm). Other ranges are also possible.

In other embodiments, the microglass fibers may vary significantly in length as a result of process variations. For instance, in some embodiments, the average aspect ratios (length to diameter ratio) of the microglass fibers in a layer (or sub-layer) may be greater than or equal to about 100, greater than or equal to about 200, greater than or equal to about 300, greater than or equal to about 1000, greater than or equal to about 3,000, greater than or equal to about 6,000, greater than or equal to about 9,000. In some instances, the microglass fibers may have an average aspect ratio of less than or equal to about 10,000, less than or equal to about 5,000, less than or equal to about 2,500, less than or equal to about 600, or less than or equal to about 300. Combinations of the above-referenced ranges are also possible (e.g., greater than or equal to about 200 and less than or equal to about 2,500). Other values of average aspect ratio are also possible. It should be appreciated that the above-noted dimensions are not limiting and that the microglass fibers may also have other dimensions.

In some embodiments in which microglass fibers are included in the fiber web, the weight percentage of microglass fibers in the fiber web may be greater than or equal to about 1 wt %, greater than or equal to about 10 wt %, greater than or equal to about 30 wt %, greater than or equal to about 50 wt %, greater than or equal to about 70 wt %, or greater than or equal to about 90 wt %. In some instances, the weight percentage of microglass fibers in the fiber web may be less than or equal to about 100 wt %, less than or equal to about 80 wt %, less than or equal to about 60 wt %, less than or equal to about 40 wt %, less than or equal to about 20 wt %, or less than or equal to about 10 wt %. Combinations of the above-referenced ranges are also possible (e.g., greater than or equal to about 1 wt % and less than or equal to about 80 wt %). Other values of weight percentage of the microglass fibers in the fiber web are also possible. In some embodiments, the fiber web contains 100 wt % microglass fibers. In other embodiments, the fiber web contains 0 wt % microglass fibers.

In general, chopped strand glass fibers may have an average fiber diameter that is greater than the diameter of the microglass fibers. For instance, in some embodiments, the average diameter of the chopped strand glass fibers may be greater than or equal to about 5 microns, greater than or equal to about 7 microns, greater than or equal to about 9 microns, greater than or equal to about 11 microns, or greater than or equal to about 20 microns. In some instances, the chopped strand glass fibers may have an average fiber diameter of less than or equal to about 30 microns, less than or equal to about 25 microns, less than or equal to about 15 microns, less than or equal to about 12 microns, or less than or equal to about 10 microns. Combinations of the above-referenced ranges are also possible (e.g., greater than or equal to about 5 microns and less than or equal to about 12 microns). Other values of average fiber diameter are also possible. Chopped strand diameters tend to follow a normal distribution. Though, it can be appreciated that chopped strand glass fibers may be provided in any appropriate average diameter distribution (e.g., Gaussian distribution).

In some embodiments, chopped strand glass fibers may have a length in the range of between about 0.125 inches and about 1 inch (e.g., about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, or less than or equal to about 0.2 inches. In certain embodiments, the average length of chopped strand glass fibers may be greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., chopped strand glass fibers having an average length of greater than or equal to about 0.125 inches and less than about 1 inch). Other ranges are also possible.

In some embodiments in which chopped strand glass fibers are included in the fiber web, the weight percentage of chopped strand glass fibers in the fiber web may be greater than or equal to about 1 wt %, greater than or equal to about 10 wt %, greater than or equal to about 20 wt %, greater than or equal to about 30 wt %, greater than or equal to about 40 wt %, or greater than or equal to about 50 wt %. In some instances, the weight percentage of chopped strand glass fibers in the fiber web may be less than or equal to about 60 wt %, less than or equal to about 50 wt %, less than or equal to about 40 wt %, less than or equal to about 30 wt %, less than or equal to about 20 wt %, or less than or equal to about 10 wt %. Combinations of the above-referenced ranges are also possible (e.g., greater than or equal to about 1 wt % and less than or equal to about 50 wt %). Other values of weight percentage of the chopped strand glass fibers in the fiber web are also possible. In some embodiments, the fiber web contains 0 wt % chopped strand glass fibers.

It should be appreciated that the above-noted dimensions are not limiting and that the microglass and/or chopped strand fibers, as well as the other fibers described herein, may also have other dimensions.

In some embodiments, in which more than one type of glass fibers are included in the fiber web, the total weight percentage of glass fibers (e.g., microglass fibers, chopped strand glass fibers, or a combination thereof) in the fiber web may be greater than or equal to about 1 wt %, greater than or equal to about 10 wt %, greater than or equal to about 30 wt %, greater than or equal to about 50 wt %, greater than or equal to about 70 wt %, or greater than or equal to about 90 wt %. In some instances, the total weight percentage of glass fibers in the fiber web may be less than or equal to about 100 wt %, less than or equal to about 80 wt %, less than or equal to about 60 wt %, less than or equal to about 40 wt %, less than or equal to about 20 wt %, or less than or equal to about 10 wt %. Combinations of the above-referenced ranges are also possible (e.g., greater than or equal to about 10 wt % and less than or equal to about 80 wt %). Other values of total weight percentage of the glass fibers in the fiber web are also possible. In some embodiments, the fiber web contains 100 wt % glass fibers. In other embodiments, the fiber web contains 0 wt % glass fibers.

The fiber web that is coated with a resin, as described herein, may have certain structural characteristics, such as basis weight and mean flow pore size. For instance, in some embodiments, the coated fiber web may have a basis weight of greater than or equal to about 50 g/m$^2$, greater than or equal to about 75 g/m$^2$, greater than or equal to about 100 g/m$^2$, greater than or equal to about 140 g/m$^2$, greater than or equal to about 180 g/m$^2$, greater than or equal to about 220 g/m$^2$, or greater than or equal to about 260 g/m$^2$. In some instances, the coated fiber web may have a basis weight of less than or equal to about 300 g/m$^2$, less than or equal to about 250 g/m$^2$, less than or equal to about 200 g/m$^2$, less than or equal to about 160 g/m$^2$, less than or equal to about 140 g/m$^2$, less than or equal to about 120 g/m$^2$, less than or equal to about 100 g/m$^2$, or less than or equal to about 70 g/m$^2$. Combinations of the above-referenced ranges are also possible (e.g., greater than or equal to about 100 g/m$^2$ and less than or equal to about 120 g/m$^2$). Other values of basis weight are also possible. The basis weight may be determined according to the standard TAPPI T410 om-98.

In some embodiments, the coated fiber web may have a mean flow pore size of greater than or equal to about 0.1 micron, greater than or equal to about 1 microns, greater than or equal to about 10 microns, greater than or equal to about 25 microns, greater than or equal to about 40 microns, greater than or equal to about 50 microns, greater than or equal to about 60 microns, greater than or equal to about 70 microns, or greater than or equal to about 80 microns. In some instances, the coated fiber web may have an average mean flow pore size of less than or equal to about 100 microns, less than or equal to about 80 microns, less than or equal to about 70 microns, less than or equal to about 60 microns, less than or equal to about 50 microns, less than or equal to about 35 microns, less than or equal to about 15 microns, less than or equal to about 5 microns, or less than or equal to about 0.5 microns. Combinations of the above-referenced ranges are also possible (e.g., greater than or equal to about 1 micron and less than or equal to about 50 microns). Other values of average mean flow pore size are also possible. The mean flow pore size may be determined according to the standard ASTM E1294 (2008) (M.F.P.).

The fiber web that is coated with a resin, as described herein, may have certain enhanced mechanical characteristics, such as stiffness, strength, and elongation. The ranges of values for stiffness, strength and elongation provided below may be for fiber webs that are uncorrugated unless otherwise indicated.

In some embodiments, the coated fiber web may have a wet stiffness in the cross direction (CD) of greater than or equal to about 100 mg, greater than or equal to about 300 mg, greater than or equal to about 600 mg, greater than or equal to about 850 mg, greater than or equal to about 1,200 mg, greater than or equal to about 1,800 mg, or greater than or equal to about 2,500 mg. In some instances, the wet stiffness in the cross direction may be less than or equal to about 3,000 mg, less than or equal to about 2,400 mg, less than or equal to about 1,800 mg, less than or equal to about 1,200 mg, less than or equal to about 950 mg, or less than or equal to about 350 mg. Combinations of the above-referenced ranges are also possible (e.g., greater than or equal to about 850 mg and less than or equal to about 950 mg). Other values of wet stiffness in the cross direction are also possible. The wet stiffness in the cross direction may be determined according to the standard T543 om-94 after soaking the fiber web in 0.1% Triton X-100 solution for 1 minute.

In some embodiments, the coated fiber web may have a wet stiffness in the machine direction (MD) of greater than or equal to about 200 mg, greater than or equal to about 270, greater than or equal to about 300 mg, greater than or equal to about 500 mg, greater than or equal to about 1,000 mg, greater than or equal to about 2,000 mg, greater than or equal to about 3,000 mg, greater than or equal to about 4,000 mg, greater than or equal to about 5,000 mg, or greater than or equal to about 6,000 mg. In some instances, the wet stiffness in the machine direction may be less than or equal to about 7,000 mg, less than or equal to about 5,000 mg, less than or equal to about 2,000 mg, less than or equal to about 1,000 mg, less than or equal to about 500 mg, less than or equal to about 400 mg, or less than or equal to about 280 mg. Combinations of the above-referenced ranges are also possible (e.g., greater than or equal to about 270 mg and less than or equal to about 280 mg). Other values of wet stiffness in the machine direction are also possible. The wet stiffness in the machine direction may be determined according to the standard T543 om-94 after soaking the fiber web in 0.1% Triton X-100 solution for 1 minute.

In some embodiments, the coated fiber web may have a total wet stiffness (i.e., the square root of the sum of the squares of the MD and CD total stiffness) of greater than or equal to about 300 mg, greater than or equal to about 1,000 mg, greater than or equal to about 2,500 mg, greater than or equal to about 4,500 mg, greater than or equal to about 6,000 mg, or greater than or equal to about 7,000 mg. In some instances, the total wet stiffness in the machine direction may be less than or equal to about 10,000 mg, less than or equal to about 8,500 mg, less than or equal to about 6,000 mg, less than or equal to about 4,000 mg, less than or equal to about 2,000 mg, or less than or equal to about 350 mg. Combinations of the above-referenced ranges are also possible (e.g., greater than or equal to about 300 mg and less than or equal to about 350 mg). Other of values of total wet stiffness are also possible. The total wet stiffness may be determined according to the standard T543 om-94 after soaking the fiber web in 0.1% Triton X-100 solution for 1 minute.

In some embodiments, the coated fiber web may have a dry stiffness in the cross direction of greater than or equal to about 120 mg, greater than or equal to about 160 mg, greater than or equal to about 200 mg, greater than or equal to about 500 mg, greater than or equal to about 1,000 mg, greater than or equal to about 2,000 mg, greater than or equal to about 3,000 mg, greater than or equal to about 4,000 mg, greater than or equal to about 5,000 mg, or greater than or equal to about 6,000 mg. In some instances, the dry stiffness in the cross direction may be less than or equal to about 7,000 mg, less than or equal to about 5,000 mg, less than or equal to about 2,000 mg, less than or equal to about 1,000 mg, less than or equal to about 500 mg, less than or equal to about 300 mg, or less than or equal to about 180 mg. Combinations of the above-referenced ranges are also possible (e.g., greater than or equal to about 160 mg and less than or equal to about 180 mg). Other values of dry stiffness in the cross direction are also possible. The dry stiffness in the cross direction may be determined according to the standard T543 om-94.

In some embodiments, the coated fiber web may have a dry stiffness in the machine direction of greater than or equal to about 200 mg, greater than or equal to about 900 mg, greater than or equal to about 1,500 mg, greater than or equal to about 3,000 mg, greater than or equal to about 6,000 mg, greater than or equal to about 9,000 mg, greater than or equal to about 12,000 mg, greater than or equal to about 15,000 mg, or greater than or equal to about 18,000 mg. In some instances, the dry stiffness in the machine direction may be less than or equal to about 20,000 mg, less than or equal to about 16,000 mg less than or equal to about 13,000 mg, less than or equal to about 10,000 mg, less than or equal to about 7,000 mg, less than or equal to about 4,000 mg, less than or equal to about 1,650 mg, or less than or equal to about 500 mg. Combinations of the above-referenced ranges are also possible (e.g., greater than or equal to about 1,500 mg, and less than or equal to about 1,650 mg). Other values of dry stiffness in the machine direction are also possible. The dry stiffness in the machine direction may be determined according to the standard T543 om-94.

In some embodiments, the coated fiber web may have a total dry stiffness (i.e., the square root of the sum of the squares of the MD and CD dry stiffness) of greater than or equal to about 1,500 mg, greater than or equal to about 1,750 mg, greater than or equal to about 3,000 mg, greater than or equal to about 6,000 mg, greater than or equal to about 9,000 mg, greater than or equal to about 12,000 mg, greater than or equal to about 15,000 mg, greater than or equal to about 18,000 mg, or greater than or equal to about 22,000 mg. In some instances, the total dry stiffness may be less than or equal to about 25,000 mg, less than or equal to about 21,000 mg, less than or equal to about 17,000 mg, less than or equal to about 13,000 mg, less than or equal to about 9,000 mg, less than or equal to about 5,000 mg, or less than or equal to about 1,900 mg. Combinations of the above-referenced ranges are also possible (e.g., greater than or equal to about 1,700 mg and less than or equal to about 1,900 mg). Other values of total dry stiffness are also possible. The total dry stiffness may be determined according to the standard T543 om-94.

The fiber web that is coated with a resin may have enhanced strength (e.g., tensile strength, tensile index, Mullen Burst strength). For instance, in some embodiments, the coated fiber web may have a wet tensile strength in the cross direction of greater than or equal to about 2 pli, greater than or equal to about 6 pli, greater than or equal to about 15 pli, greater than or equal to about 40 pli, greater than or equal to about 60 pli, or greater than or equal to about 80 pli. In some instances, the wet tensile strength in the cross direction may be less than or equal to about 100 pli, less than or equal to about 90 pli, less than or equal to about 70 pli, less than or equal to about 50 pli, less than or equal to about 30 pli, less than or equal to about 10 pli, or less than or equal to about 6 pli. Combinations of the above-referenced ranges are also possible (e.g., greater than or equal to about 6 pli and less than or equal to about 90 pli). Other values of wet tensile strength in the cross direction are also possible. The wet tensile strength in the cross direction may be determined according to the standard T494 om-96 using a jaw separation speed of 12 in/min after soaking the fiber web in 0.1% Triton X-100 solution for 1 minute.

In some embodiments, the coated fiber web may have a wet tensile strength in the machine direction (MD) of greater than or equal to about 5 pli, greater than or equal to about 10 pli, greater than or equal to about 30 pli, greater than or equal to about 60 pli, greater than or equal to about 90 pli, or greater than or equal to about 120 pli. In some instances, the wet tensile strength in the machine direction may be less than or equal to about 150 pli, less than or equal to about 125 pli, less than or equal to about 100 pli, less than or equal to about 75 pli, less than or equal to about 50 pli, less than or equal to about 25 pli, or less than or equal to about 10 pli. Combinations of the above-referenced ranges are also possible (e.g., greater than or equal to about 10 pli and less than or equal to about 140 pli). Other values of wet tensile strength in the machine direction are also possible. The wet tensile strength in the machine direction may be determined according to the standard T494 om-96 using a jaw separation speed of 12 in/min after soaking the fiber web in 0.1% Triton X-100 solution for 1 minute.

In some embodiments, the coated fiber web may have a wet tensile index (calculated by dividing the wet tensile strength by the basis weight of the fiber web) in the cross direction of greater than or equal to about 4 inches (in), greater than or equal to about 8 in, greater than or equal to about 20 in, greater than or equal to about 30 in, greater than or equal to about 50 in, or greater than or equal to about 70 in. In some instances, the wet tensile index in the cross direction may be less than or equal to about 90 in, less than or equal to about 70 in, less than or equal to about 50 in, less than or equal to about 30 in, less than or equal to about 20 in, less than or equal to about 16 in, or less than or equal to about 12 in. Combinations of the above-referenced ranges are also possible (e.g., greater than or equal to about 8 in and less than or equal to about 12 in). Other values of wet tensile index in the cross direction are also possible. The wet tensile index in the cross direction may be determined according to the standard T494 om-96 using a jaw separation speed of 12 in/min after soaking the fiber web in 0.1% Triton X-100 solution for 1 minute.

In some embodiments, the coated fiber web may have a wet tensile index (calculated by dividing the wet tensile strength by the basis weight of the fiber web) in the machine direction (MD) of greater than or equal to about 10 in, greater than or equal to about 16 in, greater than or equal to about 30 in, greater than or equal to about 50 in, greater than or equal to about 70 in, or greater than or equal to about 90 in. In some instances, the wet tensile index in the machine direction may be less than or equal to about 100 in, less than or equal to about 80 in, less than or equal to about 60 in, less than or equal to about 40 in, less than or equal to about 30 in, or less than or equal to about 20 in. Combinations of the above-referenced ranges are also possible (e.g., greater than or equal to about 16 in and less than or equal to about 20 in). Other values of wet tensile index in the machine direction are also possible. The wet tensile index in the machine direction may be determined according to the standard T494 om-96 using a cross head speed of 12 in/min after soaking the fiber web in 0.1% Triton X-100 solution for 1 minute.

In some embodiments, the coated fiber web may have a dry tensile strength in the cross direction of greater than or equal to about 2 pli, greater than or equal to about 6 pli, greater than or equal to about 15 pli, greater than or equal to about 30 pli, greater than or equal to about 45 pli, greater than or equal to about 60 pli, or greater than or equal to about 75 pli. In some instances, the dry tensile strength in the cross direction may be less than or equal to about 110 pli, less than or equal to about 90 pli, less than or equal to about 80 pli, less than or equal to about 65 pli, less than or equal to about 50 pli, less than or equal to about 35 pli, or less than or equal to about 10 pli. Combinations of the above-referenced ranges are also possible (e.g., greater than or equal to about 6 pli and less than or equal to about 90 pli). Other values of dry tensile strength in the cross direction are also possible. The dry tensile strength in the cross direction may be determined according to the standard T494 om-96 using a jaw separation speed of 12 in/min.

In some embodiments, the coated fiber web may have a dry tensile strength in the machine direction of greater than or equal to about 5 pli, greater than or equal to about 10 pli, greater than or equal to about 35 pli, greater than or equal to about 60 pli, greater than or equal to about 85 pli, or greater than or equal to about 120 pli. In some instances, the dry tensile strength in the machine direction may be less than or equal to about 150 pli, less than or equal to about 140 pli, less than or equal to about 120 pli, less than or equal to about 100 pli, less than or equal to about 80 pli, less than or equal to about 60 pli, less than or equal to about 40 pli or less than or equal to about 20 pli. Combinations of the above-referenced ranges are also possible (e.g., greater than or equal to about 35 pli and less than or equal to about 40 pli). Other values of dry tensile strength in the machine direction are also possible. The dry tensile strength in the machine direction may be determined according to the standard T494 om-96 using a jaw separation speed of 12 in/min.

In some embodiments, the coated fiber web may have a dry tensile index (calculated by dividing the dry tensile strength by the basis weight of the fiber web) in the cross direction of greater than or equal to about 30 in, greater than or equal to about 34 in, greater than or equal to about 36 in, greater than or equal to about 38 in, greater than or equal to about 40 in, or greater than or equal to about 45 in. In some instances, the dry tensile index in the cross direction may be less than or equal to about 50 in, less than or equal to about 44 in, less than or equal to about 40 in, less than or equal to about 38 in, less than or equal to about 36 in, or less than or equal to about 32 in. Combinations of the above-referenced ranges are also possible (e.g., greater than or equal to about 36 in and less than or equal to about 40 in). Other values of dry tensile strength in the cross direction are also possible. The dry tensile strength in the cross direction may be determined according to the standard T494 om-96 using a jaw separation speed of 12 in/min.

In some embodiments, the coated fiber web may have a dry tensile index (calculated by dividing the dry tensile strength by the basis weight of the fiber web) in the machine direction of greater than or equal to about 10 in, greater than or equal to about 30 in, greater than or equal to about 70 in, greater than or equal to about 90 in, greater than or equal to about 110 in, or greater than or equal to about 130 in. In some instances, the dry tensile index in the machine direction may be less than or equal to about 140 in, less than or equal to about 110 in, less than or equal to about 90 in, less than or equal to about 80 in, less than or equal to about 70 in, less than or equal to about 50 in, or less than or equal to about 20 in. Combinations of the above-referenced ranges are also possible (e.g., greater than or equal to about 70 in and less than or equal to about 80 in). Other values of dry tensile index in the machine direction are also possible. The dry tensile index in the machine direction may be determined according to the standard T494 om-96 using a jaw separation speed of 12 in/min.

In some embodiments, the coated fiber web may have a wet Mullen Burst strength of greater than or equal to about 10 kPa, greater than or equal to about 30 kPa, greater than or equal to about 60 kPa, greater than or equal to about 100 kPa, greater than or equal to about 150 kPa, greater than or equal to about 200 kPa, or greater than or equal to about 250 kPa. In some instances, the wet Mullen Burst strength may be less than or equal to about 300 kPa, less than or equal to about 250 kPa, less than or equal to about 200 kPa, less than or equal to about 150 kPa, less than or equal to about 110 kPa, or less than or equal to about 50 kPa. Combinations of the above-referenced ranges are also possible (e.g., greater than or equal to about 30 kPa and less than or equal to about 110 kPa). Other values of wet Mullen Burst strength are also possible. The wet Mullen Burst strength may be determined according to the standard T403 om-91 after soaking the fiber web in 0.1% Triton X-100 solution for 1 minute.

In some embodiments, the coated fiber web may have a dry Mullen Burst strength of greater than or equal to about 100 kPa, greater than or equal to about 140 kPa, greater than or equal to about 200 kPa, greater than or equal to about 250 kPa, greater than or equal to about 300 kPa, greater than or equal to about 350 kPa, or greater than or equal to about 500 kPa. In some instances, the dry Mullen Burst strength may be less than or equal to about 550 kPa, less than or equal to about 450 kPa, less than or equal to about 410 kPa, less than or equal to about 350 kPa, less than or equal to about 300 kPa, or less than or equal to about 200 kPa. Combinations of the above-referenced ranges are also possible (e.g., greater than or equal to about 300 kPa and less than or equal to about 410 kPa). Other values of dry Mullen Burst strength are also possible. The dry Mullen Burst strength may be determined according to the standard T403 om-91.

The fiber web that is coated with a resin may have certain elongation properties (e.g., dry peak tensile elongation, wet peak tensile elongation). For instance, in some embodiments, the coated fiber web may have a dry peak tensile elongation in the cross direction of greater than or equal to about 5%, greater than or equal to about 7%, greater than or equal to about 8%, greater than or equal to about 10%, greater than or equal to about 12%, or greater than or equal to about 14%. In some instances, the dry peak tensile elongation in the cross direction may be less than or equal to about 15%, less than or equal to about 13%, less than or equal to about 11%, less than or equal to about 9%, less than or equal to about 8%, or less than or equal to about 6%. Combinations of the above-referenced ranges are also possible (e.g., greater than or equal to about 7% and less than or equal to about 8%). Other values of dry peak tensile elongation in the cross direction are also possible. The dry peak tensile elongation in the cross direction may be determined according to the standard T494 om-96 using a test span of 4 in and a jaw separation speed of 12 in/min.

In some embodiments, the coated fiber web may have a dry peak tensile elongation in the machine direction of greater than or equal to about 4%, greater than or equal to about 4.5%, greater than or equal to about 6%, greater than or equal to about 8%, greater than or equal to about 10%, or greater than or equal to about 13%. In some instances, the tensile elongation in the machine direction may be less than or equal to about 15%, less than or equal to about 12%, less than or equal to about 9%, less than or equal to about 7%, less than or equal to about 5.5%, or less than or equal to about 5%. Combinations of the above-referenced ranges are also possible (e.g., greater than or equal to about 4.5% and less than or equal to about 5.5%). Other values of tensile elongation in the machine direction are also possible. The tensile elongation in the machine direction may be determined according to the standard T494 om-96 using a test span of 4 in and a jaw separation speed of 12 in/min.

In some embodiments, the coated fiber web may have a wet peak tensile elongation in the cross direction of greater than or equal to about 7.5%, greater than or equal to about 9%, greater than or equal to about 10%, greater than or equal to about 11%, greater than or equal to about 12%, or greater than or equal to about 13%. In some instances, the wet peak elongation in the cross direction may be less than or equal to about 15%, less than or equal to about 14%, less than or equal to about 12%, less than or equal to about 11%, less than or equal to about 10%, or less than or equal to about 8.5%. Combinations of the above-referenced ranges are also possible (e.g., greater than or equal to about 10% and less than or equal to about 11%). Other values of wet peak elongation in the cross direction are also possible. The wet peak elongation in the cross direction may be determined according to the standard T494 om-96 using a test span of 4 in and a cross head speed of 12 in/min after soaking the fiber web in 0.1% Triton X-100 solution for 1 minute.

In some embodiments, the coated fiber web may have a wet peak tensile elongation in the machine direction of greater than or equal to about 1%, greater than or equal to about 3%, greater than or equal to about 5%, greater than or equal to about 7%, greater than or equal to about 9%, or greater than or equal to about 11%. In some instances, the wet peak tensile elongation in the machine direction may be less than or equal to about 15%, less than or equal to about 12%, less than or equal to about 9%, less than or equal to about 6%, less than or equal to about 4%, or less than or equal to about 2%. Combinations of the above-referenced ranges are also possible (e.g., greater than or equal to about 1% and less than or equal to about 12%). Other values of wet peak tensile elongation in the machine direction are also possible. The wet peak tensile elongation in the machine direction may be determined according to the standard T494 om-96 using a test span of 4 in and a jaw separation speed of 12 in/min.

In some embodiments, the coated fiber web may be corrugated. The corrugated coated fiber web may have a dry stiffness in the cross direction of, for example, greater than or equal to about 120 mg, greater than or equal to about 160 mg, greater than or equal to about 200 mg, greater than or equal to about 500 mg, greater than or equal to about 1,000 mg, greater than or equal to about 2,000 mg, greater than or equal to about 3,000 mg, greater than or equal to about 4,000 mg, greater than or equal to about 5,000 mg, or greater than or equal to about 6,000 mg. In some instances, the dry stiffness in the cross direction may be less than or equal to about 7,000 mg, less than or equal to about 5,000 mg, less than or equal to about 2,000 mg, less than or equal to about 1,000 mg, less than or equal to about 750 mg, less than or equal to about 300 mg, or less than or equal to about 180 mg. Combinations of the above-referenced ranges are also possible (e.g., greater than or equal to about 160 mg and less than or equal to about 750 mg). Other values of dry stiffness in the cross direction are also possible. The dry stiffness in the cross direction may be determined according to the standard T543 om-94.

In some embodiments, the corrugated coated fiber web may have a dry stiffness in the machine direction of greater than or equal to about 500 mg, greater than or equal to about 2,000 mg, greater than or equal to about 3,800 mg, greater than or equal to about 8,000 mg, greater than or equal to about 12,000 mg, greater than or equal to about 16,000 mg, greater than or equal to about 24,000 mg, greater than or equal to about 36,000 mg, greater than or equal to about 45,000 mg, or greater than or equal to about 54,000 mg. In some instances, the dry stiffness in the machine direction may be less than or equal to about 60,000 mg, less than or equal to about 52,000 mg less than or equal to about 44,000 mg, less than or equal to about 36,000 mg, less than or equal to about 28,000 mg, less than or equal to about 20,000 mg, less than or equal to about 12,000 mg, less than or equal to about 5,000 mg, or less than or equal to about 1,000 mg. Combinations of the above-referenced ranges are also possible (e.g., greater than or equal to about 3,800 mg, and less than or equal to about 5,000 mg). Other values of dry stiffness in the machine direction are also possible. The dry stiffness in the machine direction may be determined according to the standard T543 om-94.

The fiber web described herein may also exhibit advantageous filtration performance characteristics, such as air permeability, dust holding capacity (DHC), and efficiency. In certain embodiments, the fiber web may be coated without substantially blocking the pores of the fiber web and negatively affecting air permeability. For instance, in some embodiments, a coated fiber web may have an air permeability of greater than or equal to about 5 CFM, greater than or equal to about 10 CFM, greater than or equal to about 15 CFM, greater than or equal to about 25 CFM, greater than or equal to about 30 CFM, greater than or equal to about 35 CFM, greater than or equal to about 40 CFM, greater than or equal to about 60 CFM, or greater than or equal to about 80 CFM. In some instances, the fiber web may have an air permeability of less than or equal to about 100 CFM, less than or equal to about 80 CFM, less than or equal to about 60 CFM, less than or equal to about 45 CFM, less than or equal to about 40 CFM, less than or equal to about 35 CFM, less than or equal to about 25 CFM, less than or equal to about 20 CFM, less than or equal to about 15 CFM, or less than or equal to about 10 CFM. Combinations of the above-referenced ranges are also possible (e.g., greater than or equal to about 10 CFM and less than or equal to about 15 CFM). Other values of air permeability are also possible. The air permeability may be determined according to the standard ASTM-D737-04 measured over a sample area of 38.3 cm$^2$ at a differential pressure of 125 Pa (0.5 inches of water).

The dust holding capacity may be measured according to the Palas test or the Multipass test. The dust holding capacity may be tested based on Palas filtration performance according to ISO Procedure 5011:2000, "Inlet air cleaning equipment for internal combustion engines and compressors—performance testing". Such testing is based on the following parameters: test filter area of the fiber web is 100 cm$^2$; face velocity is 20 cm/sec; dust mass concentration is 200 mg/m$^3$; dust/aerosol is SAE fine; total volume flow is about 120.0 L/min, and no discharge. The dust holding capacity is the difference in the weight of the fiber web before the exposure to the fine dust and the weight of the fiber web after the exposure to the fine dust when the pressure drop across the fiber web reaches 1,500 Pa, divided by the area of the fiber web. Dust holding capacity may be determined according to the weight (g) of dust captured per square meter of the media (e.g., through a 100 cm$^2$ test area).

The dust holding capacity may also be tested based on a Multipass Filter Test following the ISO 16889 procedure (i.e., a Multipass test) on a Multipass Filter Test Stand manufactured by FTI (e.g., Model No. TE9635). The testing uses ISO 12103-A3 medium grade test dust at a base upstream gravimetric dust level (BUGL) of 10 mg/liter. The test fluid is Aviation Hydraulic Fluid AERO HFA MIL H-5606A manufactured by Mobil. The test is run at a face velocity of 0.06 cm/s until a terminal pressure of 172 kPa.

In some embodiments, the coated fiber web may have a DHC of greater than or equal to about 80 g/m$^2$, greater than or equal to about 100 g/m$^2$, greater than or equal to about 125 g/m$^2$, greater than or equal to about 150 g/m$^2$, greater than or equal to about 175 g/m$^2$, greater than or equal to about 200 g/m$^2$, greater than or equal to about 225 g/m$^2$, greater than or equal to about 250 g/m$^2$, greater than or equal to about 275 g/m$^2$, or greater than or equal to about 300 g/m$^2$. In some instances, the DHC may be less than or equal to about 300 g/m$^2$, less than or equal to about 275 g/m$^2$, less than or equal to about 250 g/m$^2$, less than or equal to about 225 g/m$^2$, less than or equal to about 200 g/m$^2$, less than or equal to about 175 g/m$^2$, less than or equal to about 150 g/m$^2$, less than or equal to about 125 g/m$^2$, or less than or equal to about 100 g/m$^2$. Combinations of the above-referenced ranges are also possible (e.g., a DHC of greater than or equal to about 150 g/m$^2$ and less than or equal to about 300 g/m$^2$). Other ranges are also possible. The above ranges of DHC can be determined by either the Palas test or the Multipass test.

The fiber web described herein may be used as filter media for the filtration of various particle sizes. In a typical test for measuring efficiency of a layer or the entire media (e.g., according to the Palas test or the Multipass test described above), particle counts at the particle size, x, selected upstream and downstream of the layer or media can be taken every minute. For the Palas test, the particle counts measured at 1 minute after the beginning of the test are used to calculate an initial efficiency value for a selected particle size. For the Multipass test, the particle counts are measured every minute until the terminal pressure is reached, and the values are averaged over the time of the test to obtain an overall efficiency value for a selected particle size. Generally, a particle size of x means that x micron or greater particles will be captured by the layer or media at the given efficiency levels. The average of upstream and downstream particle counts can be taken at the selected particle size. From the average particle count upstream (injected –C0) and the average particle count downstream (passed thru –C) the filtration efficiency test value for the particle size selected can be determined by the relationship [(100–[C/C0])*100%].

In some embodiments, a fiber web described herein has an efficiency of between about 60% and about 100%. The efficiency may be, for example, greater than or equal to about 60%, greater than or equal to about 70%, greater than or equal to about 80%, greater than or equal to about 90%, greater than or equal to about 92%, greater than or equal to about 94%, greater than or equal to about 96%, greater than or equal to about 98%, greater than or equal to about 99%, greater than or equal to about 99.5%, greater than or equal to about 99.7%, greater than or equal to about 99.8%, greater than or equal to about 99.9%, or greater than or equal to about 99.99%. Other values of the efficiency of the filter media are also possible. The above ranges of efficiency can be determined by either the Palas test or the Multipass test. In a Palas test, the efficiencies may be achieved for particle sizes x, in microns, where x may be, for example, 0.237, 0.274, 0.316, 0.365, 0.422, 0.487, 0.562, 0.649, 0.75, 0.866, 1, 1.155, 1.334, 1.54, 1.778, or 2.054. In a Multipass test, the efficiencies may be achieved for particle sizes x, where x may be, for example, 1, 3, 4, 5, 7, 10, 15, 20, 25, or 30 microns.

In some embodiments, a fiber web described herein has an initial efficiency of between about 60% and about 100% (as measured by the Palas test). The initial efficiency may be, for example, greater than or equal to about 60%, greater than or equal to about 70%, greater than or equal to about 80%, greater than or equal to about 90%, greater than or equal to about 92%, greater than or equal to about 94%, greater than or equal to about 96%, greater than or equal to about 98%, greater than or equal to about 99%, greater than or equal to about 99.5%, greater than or equal to about 99.7%, greater than or equal to about 99.8%, greater than or equal to about 99.9%, or greater than or equal to about 99.99%. Other values of the initial efficiency of the filter media are also possible.

In some embodiments, before coating the fiber web, the fiber web may be formed using a wet strength resin (e.g., a binder resin). The wet strength resin is not in fiber form and is to be distinguished from a binder fiber (e.g., multi-component fiber) or the fiber-containing coating described above. In general, the wet strength resin may have any suitable composition. For example, the wet strength resin may comprise a polyacrylamide, epichlorohydrin, urea formaldehyde, melamine formaldehyde or a combination thereof. Other resins are also possible.

The amount of wet strength resin in the fiber web may vary. For instance, in some embodiments, the weight percentage of wet strength resin in the fiber web may be greater than or equal to about 0.5 wt %, greater than or equal to about 2 wt %, greater than or equal to about 5 wt %, greater than or equal to about 10 wt %, greater than or equal to about 20 wt %, greater than or equal to about 25 wt %, greater than or equal to about 30 wt %, greater than or equal to about 35 wt %, or greater than or equal to about 40 wt %. In some cases, the weight percentage of wet strength resin in the fiber web may be less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 2 wt %. Combinations of the above-referenced ranges are also possible (e.g., a weight percentage of wet strength resin of greater than or equal to about 5 wt % and less than or equal to about 35 wt %). Other ranges are also possible.

As described further below, the wet strength resin may be added to the fibers in any suitable manner including, for example, in the wet state. In some embodiments, the wet strength resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the wet strength resin is precipitated when added to the fiber blend. When appropriate, any suitable precipitating agent (e.g., Epichlorohydrin, fluorocarbon) may be provided to the fibers, for example, by injection into the blend. In some embodiments, upon addition to the fiber blend, the wet strength resin is added in a manner such that the layer is impregnated with the wet strength resin (e.g., the wet strength resin permeates throughout the layer). In a multi-layered web, a wet strength resin may be added to each of the layers or to only some of the layer(s) separately prior to combining the layers, or the wet strength resin may be added to the layers after combining the layers. In some embodiments, wet strength resin is added to the fiber blend while in a dry state, for example, by spraying or saturation impregnation, or any of the above methods. In other embodiments, a wet strength resin is added to a wet layer.

In some embodiments, a wet strength resin may be added to the fiber web by a solvent saturation process. In certain embodiments, a polymeric material can be impregnated into the fiber web either during or after the fiber web is being manufactured on a papermaking machine. For example, during a manufacturing process described herein, after the fiber web is formed and dried, a polymeric material in a water based emulsion or an organic solvent based solution can be adhered to an application roll and then applied to the article under a controlled pressure by using a size press or gravure saturator. The amount of the polymeric material impregnated into the fiber web typically depends on the viscosity, solids content, and absorption rate of fiber web. As another example, after the fiber web is formed, it can be impregnated with a polymeric material by using a reverse roll applicator following the just-mentioned method and/or by using a dip and squeeze method (e.g., by dipping a dried filter media into a polymer emulsion or solution and then squeezing out the excess polymer by using a nip). A polymeric material can also be applied to the fiber web by other methods known in the art, such as spraying or foaming.

A fiber web described herein may be produced using any suitable processes, such as using a wet laid process (e.g., a process involving a pressure former, a rotoformer, a fourdrinier, a hybrid former, or a twin wire process) or a non-wet laid process (e.g., a dry laid process, an air laid process, a meltblown process, an electrospinning process, a centrifugal spinning process, or a carding process). In some embodiments, the fiber web is formed using a process that results in a non-woven web. In other embodiments, the fiber web may be woven. Generally, fibers in a non-woven web are randomly entangled together, whereas fibers in a woven web are ordered.

In general, a wet laid process for forming a fiber web involves mixing together of fibers of one or more type to provide a fiber slurry. The slurry may be, for example, an aqueous-based slurry. In certain embodiments, the various fibers are optionally stored separately, or in combination, in various holding tanks prior to being mixed together (e.g., to achieve a greater degree of uniformity in the mixture). For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture.

In certain embodiments, a fiber web described herein may include a multi-layered structure that may be formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) may be applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed may then be dried and, if necessary, further processed (e.g., calendered) by using known methods to form a multi-layered fiber web. In some embodiments, such a process may result in a gradient in at least one property across the thickness of the layers. In other embodiments, a gradient in at least one property across the thickness of the layers may be produced by forming the layers separately and adhering (e.g., by laminating) the layers together.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A fiber web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% to 0.5% by weight.

Wet laid processes may be particularly suitable for forming a multi-layered structure within a fiber web, or for combining fiber web, as described herein. For instance, in some cases, the same slurry is pumped into separate headboxes to form different layers within a fiber web. For laboratory samples, a first layer can be formed from a fiber slurry, drained and dried and then a second layer can be formed on top from a fiber slurry. In other embodiments, one layer can be formed and another layer can be formed on top, drained, and dried.

In some cases, the pH of the fiber slurry may be adjusted as desired. For instance, fibers of the slurry may be distributed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion or fibrillation of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, the process involves introducing a wet strength resin (and/or other components) into a preformed fiber web. In some embodiments, as the fiber web is passed along an appropriate screen or wire, different components included in the wet strength resin, which may be in the form of separate emulsions, are added to the fiber layer using a suitable technique. In some cases, each component of the wet strength resin is mixed as an emulsion prior to being combined with the other components and/or fiber web. In some embodiments, the components included in the wet strength resin may be pulled through the fiber web using, for example, gravity and/or vacuum. In some embodiments, one or more of the components included in the wet strength resin may be diluted with softened water and pumped into the fiber layer. In some embodiments, a wet strength resin may be introduced to the fiber layer by spraying onto the formed media, or by any other suitable method, such as for example, size press application, foam saturation, curtain coating, rod coating, amongst others. In some embodiments, a wet strength resin material may be applied to a fiber slurry prior to introducing the slurry into a headbox. For example, the wet strength resin material may be introduced (e.g., injected) into the fiber slurry and impregnated with and/or precipitated on to the fibers. In some embodiments, a wet strength resin may be added to a layer by a solvent saturation process.

In other embodiments, a non-wet laid process is used to form the fiber web. For example, in a non-wet laid process, an air laid process or a carding process may be used. For example, in an air laid process, fibers may be mixed while air is blown onto a conveyor, and a wet strength resin is then applied. In a carding process, in some embodiments, the fibers are manipulated by rollers and extensions (e.g., hooks, needles) associated with the rollers prior to application of the wet strength resin. In some cases, forming the fiber web through a non-wet laid process may be more suitable for the production of a highly porous media. The non-wet fiber web may be impregnated (e.g., via saturation, spraying, etc.) with any suitable wet strength resin, as discussed above.

During or after formation of a fiber web, the fiber web may be further processed according to a variety of known techniques. Optionally, additional fiber webs (e.g., layers) can be formed and/or added to a fiber web using processes such as lamination, thermo-dot bonding, ultrasonic, calendering, glue-web, co-pleating, or collation. For example, in some cases, two fiber webs are formed into a composite article by a wet laid process as described above, and the composite article is then combined with another fiber web by any suitable process (e.g., lamination, co-pleating, or collation). In certain embodiments, lamination may be used to attach two or more separately formed phases or layers.

In some embodiments, further processing may involve pleating the fiber web. For instance, two fiber webs may be joined by a co-pleating process. In some cases, the fiber web, or various layers thereof, may be suitably pleated by forming score lines at appropriately spaced distances apart from one another, allowing the fiber web to be folded. It should be appreciated that any suitable pleating technique may be used.

In some embodiments, a fiber web can be post-processed such as subjected to a corrugation process to increase surface area within the web. In other embodiments, a fiber web may be embossed.

The fiber web described herein may be used in an overall filtration arrangement or filter element. As described herein, in some cases the fiber web may be coated with a resin that includes fibrillated fibers or other suitable fibers. In some embodiments, one or more additional layers or components are included with the fiber web (e.g., disposed adjacent to the fiber web, contacting one or both sides of the fiber web). In some embodiments, multiple fiber webs in accordance with embodiments described herein may be layered together in forming a multi-layer sheet for use in a filter media or element.

The fiber web can be incorporated into a variety of filter elements for use in various applications. Exemplary applications include air filters (e.g., heavy duty air filters, automotive air filters, HVAC filters, HEPA filters), fuel filters (e.g., ultra-low sulfur diesel), oil filters (e.g., lube oil filters or heavy duty lube oil filters), chemical processing filters, industrial processing filters, medical filters (e.g., filters for blood), water filters, and hydraulic filters (e.g., high-, medium-, and low-pressure specialty filters, including mobile and industrial filters). In some embodiments, a number of layers of fiber webs may be wrapped around an inner substrate (e.g., a synthetic or metal core) to form a wrapped filter. For example, a wrapped filter may include between 5 and 10 layers of fiber webs wrapped around the inner substrate. In some cases, the fiber web described herein can be used as filter media for coalescing applications (e.g., using a wrapped filter). For example, such fiber web may be used to remove oil from compressed air.

The filter elements may have the same property values as those noted above in connection with the fiber web. For example, the above-noted tensile strengths, air permeability, dust holding capacities, efficiencies of the fiber web may also be found in filter elements.

During use, the fiber web mechanically traps particles on or in the layers as fluid flows through the fiber web. The fiber web need not be electrically charged to enhance trapping of contamination. Thus, in some embodiments, the fiber web is not electrically charged. However, in some embodiments, the fiber web may be electrically charged.

EXAMPLES

Example 1

A fiber web coated with a resin containing fibrillated cellulose fibers was formed. The resulting fiber web had a higher tensile strength and elongation, but substantially the same air permeability and basis weight, compared to a coated fiber web that did not contain fibrillated cellulose fibers in the coating (Comparative Example 1).

The fiber web was formed from about 69 wt % softwood fibers, about 13 wt % hardwood fibers, about 12 wt % synthetic fibers, and about 6 wt % glass fibers by a wet-laid process. The coated fiber web had a basis weight of about 212 g/m$^2$, an air permeability of about 19 CFM, a wet MD tensile strength of about 17 lb/in, a wet CD tensile strength of about 7.8 lb/in, a wet MD peak elongation of about 6.6%, and a wet CD peak elongation of about 7.9%.

A resin coating was formed by first adding fibrillated cellulose fibers to pure water. The fibrillated cellulose fibers had a mean diameter in the micron range. The resulting solution/suspension containing the fibers was then added to a water-based polymeric resin (e.g., a vinyl acetate/styrene acrylic resin) that also included acrylic acid as a viscosity modifier, a water repellant, urea-formaldehyde as a crosslinker, and ammonia as a pH adjuster. The fibrillated cellulose fibers were about 1 wt % of the resin.

The fiber web was coated with the fiber-containing resin using a lab coater. The coated web was dried using a photodryer within the temperature range of about 67° C. to about 88° C. The coating constituted 22 wt % of the entire fiber web.

The coated fiber web had a 31% increase in wet tensile strength (MD), a 26% increase in wet tensile strength (CD), a 16% increase in wet peak elongation (MD), a 18% increase in wet peak elongation (CD), and substantially the same air permeability compared to the fiber web described in Comparative Example 1.

Comparative Example 1

A fiber web was formed using the process described in Example 1, except the resin did not contain a fibrillated fiber. The basis weight and air permeability of the fiber web were substantially similar as the basis weight and air permeability of the fiber web of Example 1; however, the tensile strength and elongation were lower. The coated fiber web had a wet MD tensile strength of about 13 lb/in, a wet CD tensile strength of about 6.2 lb/in. The wet MD peak elongation was about 5.7% and the wet CD peak elongation was about 6.7%.

Example 2

A fiber web coated with a resin containing nanofibrillated cellulose fibers was formed. The resulting fiber web had a higher stiffness, but substantially the same air permeability and basis weight, compared to a coated fiber web that did not contain fibrillated cellulose fibers in the coating (Comparative Example 2).

The fiber web was formed from 42 wt % softwood fibers and 58 wt % hardwood fibers by a wet-laid process. The coated fiber web had a basis weight of about 114 g/m$^2$, an air permeability of about 8.5 CFM, a wet MD stiffness of about 278 mg, a wet CD stiffness of about 169 mg, and a wet total stiffness of about 325 mg.

A resin coating was formed by first adding nanocellulose fibers to pure water. The resulting solution/suspension containing the fibers was then added to a water-based polymeric resin (e.g., a vinyl acetate/styrene acrylic resin) that also included acrylic acid as a viscosity modifier, a water repellant, urea-formaldehyde as a crosslinker, and ammonia as a pH adjuster. The nanocellulose fibers were about 0.5 wt % of the resin.

The fiber web was coated with the fiber-containing resin using a lab coater. The coated web was dried using a photodryer within the temperature range of about 67° C. to about 88° C. The coating constituted 22 wt % of the entire fiber web.

The coated fiber web had a 15% increase in wet stiffness (MD), a 14% increase in wet stiffness (CD), a 15% increase in total wet stiffness (MD), and substantially the same air permeability and basis weight compared to the fiber web described in Comparative Example 2.

Comparative Example 2

A fiber web was formed using the process described in Example 2, except the resin did not contain a nanofibrillated fiber. The basis weight and air permeability of the fiber web were substantially similar as the basis weight and air permeability of the fiber web of Example 2; however, the coated fiber web of this comparative example had a lower stiffness. The coated fiber web had a wet MD stiffness of about 241 mg, a wet CD stiffness of about 148 mg, and a total wet stiffness of about 283 mg.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An article, comprising:
   a non-woven web comprising a plurality of fibers; and
   a resin comprising a plurality of fibrillated fibers distributed therein, wherein the plurality of fibrillated fibers distributed within the resin coats at least a portion of the plurality of fibers within an interior of the non-woven web, and wherein the weight percent of the plurality of fibrillated fibers within the resin is greater than or equal to about 0.5 wt % and less than or equal to about 5 wt %, and the weight percentage of the plurality of fibrillated fibers within the resin is based on dry resin solids.

2. An article, comprising:
a non-woven web comprising a plurality of fibers; and
a resin comprising a plurality of non-conductive nanofibers distributed therein, wherein the plurality of non-conductive nanofibers distributed within the resin coats at least a portion of the plurality of fibers within an interior of the non-woven web, wherein the weight percent of the plurality of non-conductive nanofibers within the resin is greater than or equal to about 0.5 wt % and less than or equal to about 5 wt %, and wherein the weight percentage of the plurality of non-conductive nanofibers within the resin is based on dry resin solids.

3. A method, comprising:
providing a non-woven web comprising a plurality of fibers; and
coating at least a portion of the plurality of fibers within an interior of the non-woven web with a plurality of fibrillated fibers distributed within a resin, wherein the weight percent of the plurality of fibrillated fibers within the resin is greater than or equal to about 0.5 wt % and less than or equal to about 5 wt % of the resin, and the weight percentage of the plurality of fibrillated fibers within the resin is based on dry resin solids.

4. A method, comprising:
providing a non-woven web comprising a plurality of fibers; and
coating at least a portion of the plurality of fibers within an interior of the non-woven web with a plurality of non-conductive nanofibers distributed within a resin, wherein the weight percent of the plurality of non-conductive nanofibers within the resin is greater than or equal to about 0.5 wt % and less than or equal to about 5 wt %, and the weight percentage of the plurality of non-conductive nanofibers within the resin is based on dry resin solids.

5. The article of claim 2, wherein the plurality of non-conductive nanofibers comprises fibrillated fibers.

6. The article of claim 2, wherein the plurality of non-conductive nanofibers comprises cellulose fibers.

7. The article of claim 2, wherein the plurality of non-conductive nanofibers comprises regenerated cellulose fibers.

8. The article of claim 2, wherein the plurality of non-conductive nanofibers comprises a synthetic polymer.

9. The article of claim 2, wherein the plurality of non-conductive nanofibers comprises cellulose fibers comprising both crystalline and amorphous regions.

10. The article of claim 2, wherein the plurality of non-conductive nanofibers have an average diameter of less than or equal to about 1 micron.

11. The article of claim 1, wherein the plurality of fibrillated fibers have an average diameter of greater than about 1 micron.

12. The article of claim 2, wherein the plurality of non-conductive nanofibers have an average diameter of less than or equal to about 100 nm.

13. The article of claim 2, wherein the plurality of non-conductive nanofibers have an average diameter of less than or equal to about 20 nm.

14. The article of claim 2, wherein the resin is water soluble.

15. The article of claim 2, wherein the plurality of fibers of the non-woven web comprises cellulose fibers.

16. The article of claim 2, wherein the plurality of fibers of the non-woven web comprises glass fibers.

17. The article of claim 2, wherein the plurality of fibers of the non-woven web comprises synthetic polymeric fibers.

18. The article of claim 2, wherein the non-woven web is a filter medium.

19. The article of claim 2, wherein the weight percent of the resin within the non-woven web is greater than or equal to about 18 wt % and less than or equal to about 25 wt %.

20. The article of claim 2, wherein the resin coats the entire non-woven web throughout the thickness of the web.

21. A filter element comprising an article of claim 2.

22. The article of claim 2, wherein the non-woven web has a wet tensile strength in the machine direction of greater than or equal to about 10 pli and less than or equal to about 140 pli.

23. The article of claim 2, wherein the non-woven web has a wet tensile strength in the cross direction of greater than or equal to about 6 pli and less than or equal to about 90 pli.

24. The article of claim 2, wherein the non-woven web has a tensile elongation of in the machine direction of greater than or equal to about 4% and less than or equal to about 15%.

25. The article of claim 2, wherein the non-woven web has a tensile elongation of in the cross direction of greater than or equal to about 5% and less than or equal to about 15%.

26. The article of claim 2, wherein the non-woven web has a dry tensile strength in the machine direction of greater than or equal to about 10 pli and less than or equal to about 140 pli.

27. The article of claim 2, wherein the non-woven web has a wet Mullen Burst strength of greater than or equal to about 30 kPa and less than or equal to about 300 kPa.

28. The article of claim 2, wherein the non-woven web has a dry Mullen Burst strength of greater than or equal to about 320 kPa and less than or equal to about 600 kPa.

29. The article of claim 2, wherein the resin is an aqueous-based resin.

30. The article of claim 15, wherein the non-woven web comprises greater than or equal to about 85 wt % cellulose fibers.

31. The article of claim 2, wherein the resin coats at least a portion of a surface of the non-woven web.

* * * * *